(12) United States Patent
Moon et al.

(10) Patent No.: US 11,006,390 B2
(45) Date of Patent: May 11, 2021

(54) DEVICE AND METHOD FOR TRANSMITTING/RECEIVING SIGNAL IN WIRELESS COMMUNICATION SYSTEM SUPPORTING UNLICENSED BAND

(71) Applicant: Samsung Electronics Co., Ltd., Suwon-si (KR)

(72) Inventors: Jung-Min Moon, Suwon-si (KR); Sun-Heui Ryoo, Yongin-si (KR); Seung-Hoon Park, Seoul (KR); Jung-Soo Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 162 days.

(21) Appl. No.: 15/572,469

(22) PCT Filed: May 9, 2016

(86) PCT No.: PCT/KR2016/004821
§ 371 (c)(1),
(2) Date: Nov. 7, 2017

(87) PCT Pub. No.: WO2016/178550
PCT Pub. Date: Nov. 10, 2016

(65) Prior Publication Data
US 2018/0176890 A1 Jun. 21, 2018

(30) Foreign Application Priority Data
May 7, 2015 (KR) .......... 10-2015-0063668

(51) Int. Cl.
*H04W 72/04* (2009.01)
*H04L 1/18* (2006.01)
(Continued)

(52) U.S. Cl.
CPC .......... *H04W 72/04* (2013.01); *H04L 1/1867* (2013.01); *H04L 1/1893* (2013.01); *H04L 1/203* (2013.01);
(Continued)

(58) Field of Classification Search
CPC ........ H04L 1/1893; H04L 1/18; H04W 16/14; H04W 72/04; H04W 74/0808
See application file for complete search history.

(56) References Cited

U.S. PATENT DOCUMENTS

2005/0152313 A1  7/2005  Cave et al.
2006/0253736 A1  11/2006  Rudolf et al.
(Continued)

FOREIGN PATENT DOCUMENTS

KR  10-2005-0074296 A  7/2005
KR  10-2007-0046942 A  5/2007
(Continued)

OTHER PUBLICATIONS

ISA/KR, "International Search Report," Application No. PCT/KR2016/004821, dated Jul. 29, 2016, 5 pages.
(Continued)

*Primary Examiner* — Anez C Ebrahim

(57) ABSTRACT

The present invention relates to a $5^{th}$ generation (5G) or pre-5G communication system to be provided for supporting a data transmission rate higher than that of a $4^{th}$ generation (4G) communication system such as long term evolution (LTE). According to the present invention, a method by which a transmission device transmits a signal is a wireless communication system supporting an unlicensed band comprises the steps of: detecting the need for controlling a clear channel assessment (CCA) threshold during the performance of a CCA process; and controlling the CCA threshold used in the CCA process.

14 Claims, 12 Drawing Sheets

(51) Int. Cl.
*H04W 74/08* (2009.01)
*H04L 1/20* (2006.01)
*H04W 16/14* (2009.01)
*H04W 74/00* (2009.01)
*H04W 52/24* (2009.01)
*H04W 52/36* (2009.01)
*H04W 24/10* (2009.01)

(52) U.S. Cl.
CPC ....... *H04W 16/14* (2013.01); *H04W 74/0808* (2013.01); *H04W 24/10* (2013.01); *H04W 52/243* (2013.01); *H04W 52/365* (2013.01); *H04W 74/006* (2013.01)

(56) References Cited

U.S. PATENT DOCUMENTS

| | | | |
|---|---|---|---|
| 2008/0192810 A1 | 8/2008 | Razzell et al. | |
| 2013/0188506 A1 | 7/2013 | Cheong et al. | |
| 2015/0103707 A1* | 4/2015 | Panta | H04W 40/005 370/311 |
| 2015/0163824 A1* | 6/2015 | Krzymien | H04W 28/18 370/338 |
| 2015/0245327 A1* | 8/2015 | Damnjanovic | H04W 24/08 370/336 |
| 2016/0127098 A1* | 5/2016 | Ng | H04L 5/0048 370/329 |

FOREIGN PATENT DOCUMENTS

| | | |
|---|---|---|
| KR | 10-2008-0005534 A | 1/2008 |
| KR | 10-2013-0069529 A | 6/2013 |
| WO | 2013152305 A1 | 10/2013 |
| WO | 2014190284 A1 | 11/2014 |

OTHER PUBLICATIONS

ISA/KR, "Written Opinion of the International Searching Authority," Application No. PCT/KR2016/004821, dated Jul. 29, 2016, 6 pages.

* cited by examiner

DEVICE AND METHOD FOR TRANSMITTING/RECEIVING SIGNAL IN WIRELESS COMMUNICATION SYSTEM SUPPORTING UNLICENSED BAND

CROSS-REFERENCE TO RELATED APPLICATIONS AND CLAIM OF PRIORITY

This application is a National Stage of International Application No. PCT/KR2016/004821, filed May 9, 2016, which is related to and claims priority to Korean Application No. 10-2015-0063668 filed on May 7, 2015, the contents of which are incorporated herein by reference.

TECHNICAL FIELD

The present disclosure relates to a signal transmitting/receiving apparatus and method in a wireless communication system supporting a unlicensed band, and more particularly, to a signal transmitting/receiving apparatus and method for decreasing transmission delay in a wireless communication system supporting a unlicensed band.

BACKGROUND

To meet the demand for wireless data traffic, which has increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long-term evolution (LTE) system'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a device-to-device (D2D) communication, a wireless backhaul, a moving network, a cooperative communication, coordinated multi-points (CoMP), reception-end interference cancellation, and the like.

In the 5G system, a hybrid frequency shift keying (FSK) and quadrature amplitude modulation (QAM) modulation (FQAM) and a sliding window superposition coding (SWSC) as an advanced coding modulation (ACM) scheme, and a filter bank multi carrier (FBMC) scheme, a non-orthogonal multiple Access (NOMA) scheme, and a sparse code multiple access (SCMA) scheme as an advanced access technology have been developed.

As mobile devices such as a smart phone has been developed, amount of traffic has been explosively increased. So, a communication service using a unlicensed band which is not licensed for a specific communication provider such as a local area network (LAN) or a Bluetooth has been provided.

In a wireless LAN which may be constructed at low cost, it is possible to use a unlicensed band, so the use of the unlicensed band has been emerged as a major solution of a cellular communication provider which is difficult to handle mobile traffic using only a cellular network.

Meanwhile, "licensed band" denotes a frequency band which is licensed for a specific communication provider, and denotes a frequency band which is dedicatedly allocated for a specific usage, e.g., an LTE scheme.

Alternatively, "unlicensed band" denotes a frequency band which is unlicensed for a specific communication provider, and denotes a shared frequency band which is open to public. The unlicensed band may be used as a frequency band for industry, science, and medical communications. Typical communication services among communication services using the unlicensed band are a Wi-Fi service and a Bluetooth service. So, any device which satisfies a specific criterion for using the unlicensed band may use the unlicensed band.

So, most cellular communication providers guide subscribers to receive a communication service through an access point (AP) included in a wireless LAN if it is difficult to directly deploy a wireless LAN or to handle traffic of subscribers using only enhanced node Bs (eNBs) while cooperating with an existing wireless LAN provider such as a region with a very high floating population, and/or the like.

As described above, a wireless LAN which is deployed for handing traffic by cellular communication providers has a characteristic different from a cellular network. So, it is difficult to provide subscribers subscribed to cellular communication providers with the same mobility or security as an eNB.

So, an active study for a scheme of directly providing a service subscribers with a service in a unlicensed band which is unlicensed for cellular communication providers as well as a scheme in which the cellular communication providers deploy an AP to provide a mobile communication service has been progressed. A typical one of schemes of providing a service using a unlicensed band is an LTE-unlicensed (LTE-U) scheme. In a communication system supporting the LTE-U scheme, a user equipment (UE) and an eNB may use a carrier or a channel which exists in a licensed band and a unlicensed band together.

A transmitting device using a unlicensed band may be classified into a frame based equipment (FBE) and a load based equipment (LBE), and each of the FBE and the LBE needs to satisfy predetermined regulation.

Regulation which each of the FBE and the LBE needs to satisfy, i.e., listen before talk (LBT) regulation for each of the FBE and the LBE will be described below.

A process for performing an LBT regulation process in an FBE in a general communication system supporting a unlicensed band will be described with reference to FIG. 1. Here, the LBT regulation process denotes a process related to LBT regulation.

FIG. 1 schematically illustrates a process for performing an LBT regulation process in an FBE in a general communication system supporting a unlicensed band.

Prior to description of FIG. 1, the FBE needs to satisfy predetermined LBT regulation, i.e., LBT regulation in which a clear channel assessment (CCA) process needs to be performed during minimum 20 us before a transmitting operation is performed. Here, a CCA process denotes a process in which a transmitting device measures strength of interference in a unlicensed band, and determines whether another device other than the transmitting device currently uses the unlicensed band based on the measured strength of the interference in the unlicensed band.

Based on the result of the CCA process, if the strength of the interference in the unlicensed band is greater than or equal to a predetermined threshold value, the FBE does not perform a transmitting operation in the unlicensed band.

That is, if the strength of the interference in the unlicensed band is greater than or equal to the predetermined threshold value, the FBE determines that the another device occupies the unlicensed band, so the FBE does not perform the transmitting operation in the unlicensed band.

If the strength of the interference in the unlicensed band is less than the predetermined threshold value, the FBE performs the transmitting operation in the unlicensed band. That is, if the strength of the interference in the unlicensed band is less than the predetermined threshold value, the FBE determines that the another device does not occupy the unlicensed band, so the FBE performs the transmitting operation in the unlicensed band.

If the CCA process is successful, that is, if the strength of the interference in the unlicensed band is less than the threshold value, the FBE may occupy the unlicensed band during preset time, e.g., time from minimum 1 ms to maximum 10 ms. After occupying the unlicensed band, the FBE should not perform a transmission operation in the unlicensed band for preset time, e.g., at least 5% of the time during the FBE occupies the unlicensed band. That is, the FBE performs an idle operation for at least 5% of the time during the FBE occupies the unlicensed band after occupying the unlicensed band. Here, time which correspond to at least 5% of the unlicensed band, i.e., a period during which the FBE does not perform a transmitting operation in the unlicensed band after occupying the unlicensed band will be referred to as idle period.

Based on the result of the CCA process, if it is determined that another device other than the FBE currently uses the unlicensed band, the FBE may perform a CCA process again after a predetermined fixed frame period elapses.

A process for performing an LBT regulation process in an FBE in a general communication system supporting a unlicensed band has been described with reference to FIG. 1, and a process for performing an LBT regulation process in an LBE in a general communication system supporting a unlicensed band will be described with reference to FIG. 2.

FIG. 2 schematically illustrates a process for performing an LBT regulation process in an LBE in a general communication system supporting a unlicensed band.

Prior to description of FIG. 2, like in an FBE, the LBE needs to satisfy predetermined LBT regulation, i.e., LBT regulation in which a CCA process needs to be performed during minimum 20 us before a transmitting operation is performed.

Based on the result of the CCA process, if strength of interference in the unlicensed band is greater than or equal to a predetermined threshold value, the LBE does not perform a transmitting operation in the unlicensed band. That is, if the strength of the interference in the unlicensed band is greater than or equal to the predetermined threshold value, the LBE determines that another device occupies the unlicensed band, so the LBE does not perform the transmitting operation in the unlicensed band.

If the strength of the interference in the unlicensed band is less than the predetermined threshold value, the LBE performs the transmitting operation in the unlicensed band. That is, if the strength of the interference in the unlicensed band is less than the predetermined threshold value, the LBE determines that the another device does not occupy the unlicensed band, so the LBE performs the transmitting operation in the unlicensed band.

Based on the result of the CCA process, if it is determined that the another device other than the LBE currently uses the unlicensed band, the LBE may additionally perform a CCA process unlike the FBE. Here, a CCA process which is additionally performed will be referred to as extended CCA (ECCA) process. The ECCA process may include N CCA processes, and N is a value which is within [1, q] and randomly selected by the LBE. Further, q is a predetermined value.

Based on the result of the ECCA process, if it is detected that there is no another device currently using the unlicensed band, that is, if the strength of the interference in the unlicensed band is less than the threshold value, the LBE performs a transmitting operation in the unlicensed band. Here, time during which the LBE may occupy the unlicensed band may be, for example, maximum (13/32)*q ms, and should not perform a transmitting operation in the unlicensed band during, for example, $T_{ECCA}$ after occupying the unlicensed band. That is, the LBE performs an idle operation during the $T_{ECCA}$ after occupying the unlicensed band. Here, the $T_{ECCA}$, i.e., the time period during which the LBE does not perform a transmitting operation in the unlicensed band after occupying the unlicensed band will be referred to as idle time period. The $T_{ECCA}$ may be set to $T_{CCA}*N$, and the $T_{CCA}$ denotes a time period required for performing a CCA process.

The LBE regulation process performed in the FBE and the LBE regulation process performed in the LBE may be different in view of the following aspects.

Firstly, an aspect of a probability that a unlicensed band will be occupied will be described blow.

In an aspect of a probability that a unlicensed band will be occupied, an LBE shows better performance than an FBE. The reason is why the FEB may perform a CCA process again only after waiting during a fixed frame period if the CCA process is failed, but the LBE may perform an ECCA process, i.e., additional N CCA processes after a CCA process is failed.

So, in case of the FBE having a lower probability of occupying the unlicensed band, a probability that transmission delay occurs may be higher compared to the LBE.

Secondly, an aspect of scheduling will be described blow.

Firstly, in an aspect of scheduling, i.e., in an aspect of transmitting a physical downlink control channel (PDCCH) signal, implementation in an FBE is simpler compared to an LBE. That is, the FBE may uses a unlicensed band based on a sub-frame boundary, i.e., a timing at which a PDCCH signal is transmitted, but the LBE randomly selects N as the number of CCA processes included in an ECCA process, so a timing at which the LBE starts occupying the unlicensed band may not be identical to the sub-frame boundary in the LBE.

So, the LBE reserves a part of the first sub-frame, and may perform a PDCCH signal transmitting operation and data transmitting operation from the second sub-frame.

A channel reserving operation of an LBE in a general wireless communication system supporting a unlicensed band will be described with reference to FIG. 3.

FIG. 3 schematically illustrates a channel reserving operation of an LBE in a general wireless communication system supporting a unlicensed band.

Referring to FIG. 3, an LBE randomly selects N as the number of CCA processes included in an ECCA process, so a timing at which the LBE starts occupying a unlicensed band may not be identical to a sub-frame boundary.

So, the LBE reserves a part of the first sub-frame, i.e., a sub-frame #0, and may perform a PDCCH signal transmitting operation and data transmitting operation from the second sub-frame. In FIG. 3, it will be noted that the second sub-frame is shown as DL #1.

Thirdly, an aspect of relation with another device will be described below.

An FBE gives relatively little damage to other devices which may share a unlicensed band, for example, a Wi-Fi terminal, compared to an LBE. This is why the LBE generally has a higher probability of occupying the unlicensed band than the FBE. That is, if the LBE occupies the unlicensed band, the other devices may not occupy the unlicensed band.

As described above, in an LBT regulation process for a unlicensed band, both of an FBE and an LBE may have advantages and disadvantages in various aspects. In particular, transmission delay which may occur in a current LBT regulation process may severely degrade service quality.

So, there is a need for an LBT regulation process for decreasing transmission delay.

The above information is presented as background information only to assist with an understanding of the present disclosure. No determination has been made, and no assertion is made, as to whether any of the above might be applicable as prior art with regard to the present disclosure.

SUMMARY

An embodiment of the present disclosure proposes an apparatus and method for transmitting/receiving a signal in a wireless communication system supporting a unlicensed band.

An embodiment of the present disclosure proposes an apparatus and method for transmitting/receiving a signal thereby decreasing transmission delay in a wireless communication system supporting a unlicensed band.

An embodiment of the present disclosure proposes an apparatus and method for transmitting/receiving a signal thereby enabling to perform an LBT regulation process corresponding to transmission delay in a wireless communication system supporting a unlicensed band.

An embodiment of the present disclosure proposes an apparatus and method for transmitting/receiving a signal thereby enabling to perform an LBT regulation process by adaptively controlling a CCA threshold value corresponding to transmission delay in a wireless communication system supporting a unlicensed band.

An embodiment of the present disclosure proposes an apparatus and method for transmitting/receiving a signal thereby enabling to perform an LBT regulation process in which a transmitting device reports transmission power information in a wireless communication system supporting a unlicensed band.

An embodiment of the present disclosure proposes an apparatus and method for transmitting/receiving a signal thereby enabling to perform an LBT regulation process for increasing a probability that a clear channel is detected.

An embodiment of the present disclosure proposes a method for transmitting a signal by a transmitting device in a wireless communication system supporting a unlicensed band, and the method comprises detecting that there is a need for controlling a clear channel assessment (CCA) threshold value while performing a CCA process, and controlling the CCA threshold value used in the CCA process.

An embodiment of the present disclosure proposes a method for transmitting a signal by a transmitting device in a wireless communication system supporting a unlicensed band, and the method comprises detecting that there is a need for controlling a clear channel assessment (CCA) threshold value while performing an extended CCA (ECCA) including at least one CCA process according to failure of a CCA process, and controlling the CCA threshold value used in the at least one CCA process.

An embodiment of the present disclosure proposes a transmitting device in a wireless communication system supporting a unlicensed band, and the transmitting device comprises a controller for performing an operation of detecting that there is a need for controlling a clear channel assessment (CCA) threshold value while performing a CCA process, and an operation of controlling the CCA threshold value used in the CCA process.

An embodiment of the present disclosure proposes a transmitting device in a wireless communication system supporting a unlicensed band, and the transmitting device comprises a controller for performing an operation of detecting that there is a need for controlling a clear channel assessment (CCA) threshold value while performing an extended CCA (ECCA) including at least one CCA process according to failure of a CCA process, and an operation of controlling the CCA threshold value used in the at least one CCA process.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain exemplary embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
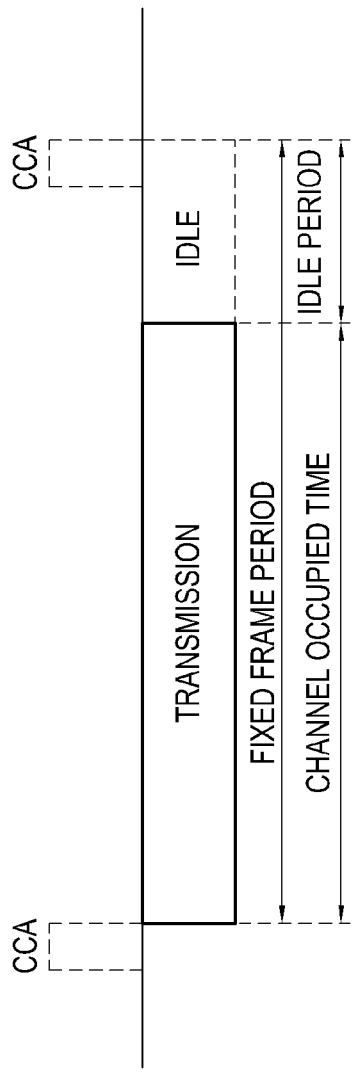
FIG. 1 schematically illustrates a process for performing an LBT regulation process in an FBE in a general communication system supporting a unlicensed band.
Figure 2:
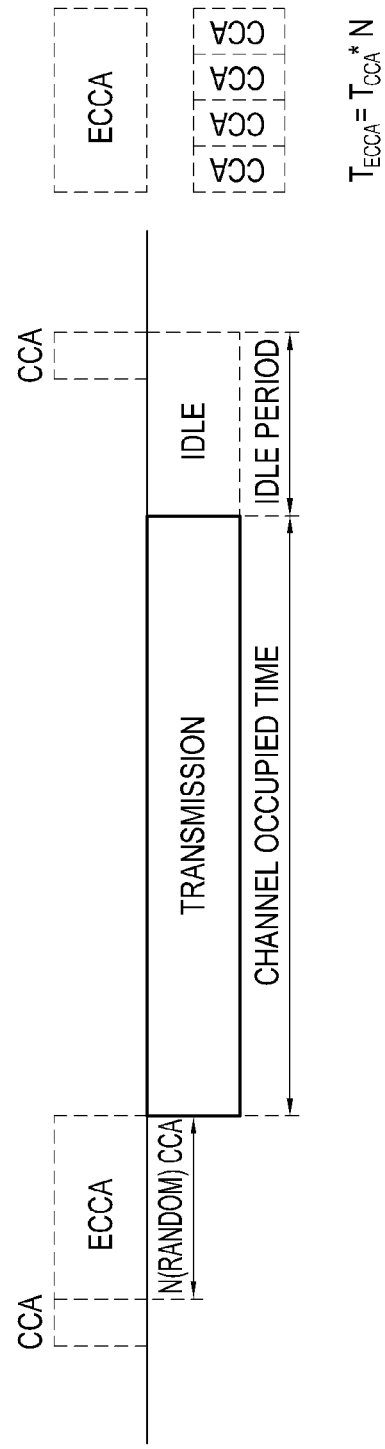
FIG. 2 schematically illustrates a process for performing an LBT regulation process in an LBE in a general communication system supporting a unlicensed band.
Figure 3:
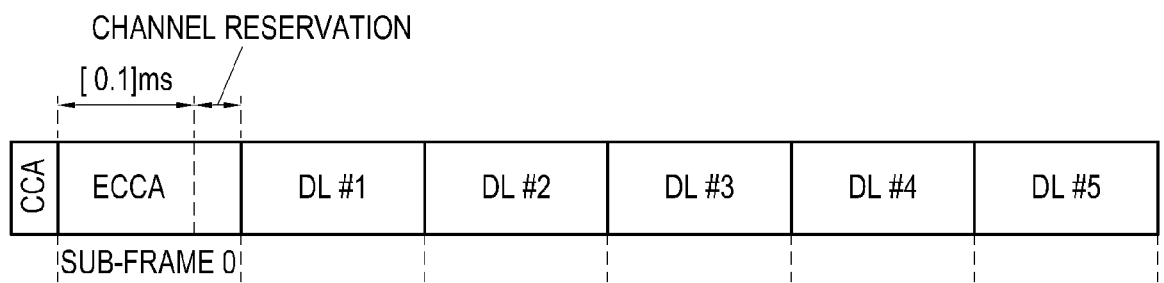
FIG. 3 schematically illustrates a channel reserving operation of an LBE in a general wireless communication system supporting a unlicensed band.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV', or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, a transmitting device may be, for example, an electronic device.

According to various embodiments of the present disclosure, the transmitting device may be, for example, a user equipment (UE), an enhanced node B (eNB), and/or the like.

According to various embodiments of the present disclosure, the transmitting device may be, for example, a frame based equipment (FBE), a load based equipment (LBE), and/or the like.

An embodiment of the present disclosure proposes an apparatus and method for transmitting/receiving a signal in a wireless communication system supporting a unlicensed band.

An embodiment of the present disclosure proposes an apparatus and method for transmitting/receiving a signal thereby decreasing transmission delay in a wireless communication system supporting a unlicensed band.

An embodiment of the present disclosure proposes an apparatus and method for transmitting/receiving a signal thereby enabling to perform a listen before talk (LBT) regulation process corresponding to transmission delay in a wireless communication system supporting a unlicensed band. Here, the LBT regulation process denotes a process performed for satisfying LBT regulation.

An embodiment of the present disclosure proposes an apparatus and method for transmitting/receiving a signal thereby enabling to perform an LBT regulation process by adaptively controlling a clear channel assessment (CCA) threshold value corresponding to transmission delay in a wireless communication system supporting a unlicensed band.

An embodiment of the present disclosure proposes an apparatus and method for transmitting/receiving a signal thereby enabling to perform an LBT regulation process in which a transmitting device reports transmission power information in a wireless communication system supporting a unlicensed band.

Further, an embodiment of the present disclosure proposes an apparatus and method for transmitting/receiving a signal thereby enabling to perform an LBT regulation process for increasing a probability that a clear channel is detected.

An apparatus and method proposed in various embodiments of the present disclosure may be applied to various communication systems such as a long term evolution (LTE) mobile communication system, an LTE-advanced (LTE-A) mobile communication system, a licensed-assisted access (LAA) mobile communication system, a high speed downlink packet access (HSDPA) mobile communication system, a high speed uplink packet access (HSDPA) mobile communication system, a high rate packet data (HRPD) mobile communication system proposed in a $3^{rd}$ generation partnership project 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16m communication system, an evolved packet system (EPS), a mobile internet protocol (Mobile IP) system, and/or the like.

An embodiment of the present disclosure proposes a method for transmitting a signal by a transmitting device in a wireless communication system supporting a unlicensed band, and the method comprises detecting that there is a need for controlling a clear channel assessment (CCA) threshold value while performing an extended CCA (ECCA) including at least one CCA process according to failure of a CCA process, and controlling the CCA threshold value used in the at least one CCA process.

Here, the method further comprises controlling transmission power used in the at least one CCA process corresponding to the controlled CCA threshold value.

Here, detecting that there is the need for controlling the CCA threshold value while performing the at least one CCA process comprises:

detecting there is the need for controlling the CCA threshold value if transmission delay which corresponds to predetermined time occurs while performing the at least one CCA process.

Here, detecting that there is the need for controlling the CCA threshold value while performing the at least one CCA process comprises:

detecting there is the need for controlling the CCA threshold value if a number of automatic repeat request (ARQ) acknowledgments (ACKs) for data transmitted through a unlicensed band during predetermined time, or the number of ARQ non-acknowledgments (NACKs) for the data transmitted through the unlicensed band during the predetermined time is greater than or equal to, or less than or equal to a predetermined threshold value, or detecting there is the need for controlling the CCA threshold value if a number of hybrid automatic repeat request (HARQ) ACKs for data transmitted through a unlicensed band during predetermined time, or the number of HARQ NACKs for the data transmitted through the unlicensed band during the predetermined time is greater than or equal to, or less than or equal to a predetermined threshold value.

Here, detecting that there is the need for controlling the CCA threshold value while performing the at least one CCA process comprises:

detecting there is the need for controlling the CCA threshold value if throughput for data transmitted through a unlicensed band during predetermined time is greater than or equal to, or less than or equal to predetermined threshold throughput, or detecting there is the need for controlling the CCA threshold value if average latency for data transmitted through a unlicensed band during predetermined time is greater than or equal to, or less than or equal to predetermined threshold latency.

Here, detecting that there is the need for controlling the CCA threshold value while performing the at least one CCA process comprises:

detecting there is the need for controlling the CCA threshold value if a number of CCA slots in a clear channel state among CCA processes performed in a unlicensed band during predetermined time is greater than or equal to, or less than or equal to a predetermined threshold value, or detecting there is the need for controlling the CCA threshold value if a number of CCA slots in a busy channel state among CCA processes performed in the unlicensed band during predetermined time is greater than or equal to, or less than or equal to a predetermined threshold value.

Here, detecting that there is the need for controlling the CCA threshold value while performing the at least one CCA process comprises:

detecting there is the need for controlling the CCA threshold value if time during which the transmitting device occupies a unlicensed band during predetermined time is longer than or equal to, or shorter than or equal to predetermined threshold time, or detecting there is the need for controlling the CCA threshold value if time during which the transmitting device does not occupy a unlicensed band during predetermined time is longer than or equal to, or shorter than or equal to predetermined threshold time.

Here, detecting that there is the need for controlling the CCA threshold value while performing the at least one CCA process comprises:

detecting there is the need for controlling the CCA threshold value if average signal strength from at least one transmitting device measured in a unlicensed band during predetermined time is greater than or equal to, or less than or equal to predetermined threshold signal strength, detecting there is the need for controlling the CCA threshold value if an average buffer occupancy rate of a transmitting device measured in a unlicensed band during predetermined time is greater than or equal to, or less than or equal to a predetermined threshold buffer occupancy rate, or detecting there is the need for controlling the CCA threshold value upon receiving a predefined signal in a unlicensed band from other transmitting devices.

Here, controlling the CCA threshold value used in the at least one CCA process comprises:

controlling the CCA threshold value such that a fixed CCA threshold value is used every CCA opportunity as an opportunity at which a CCA process is performable.

Here, controlling the CCA threshold value used in the at least one CCA process comprises:

controlling the CCA threshold value such that a plurality of CCA threshold values are used every CCA opportunity as an opportunity at which a CCA process is performable.

Here, controlling the CCA threshold value used in the at least one CCA process comprises:

controlling the CCA threshold value such that a CCA threshold value which is less than a CCA threshold value used at a current CCA opportunity is to be used at a next CCA opportunity, or controlling the CCA threshold value such that a CCA threshold value which is greater than the CCA threshold value used at the current CCA opportunity is to be used at the next CCA opportunity, and wherein a CCA opportunity denotes an opportunity at which a CCA process is performable.

Here, the CCA threshold value is a CCA threshold value which the transmitting device and other transmitting devices included in a group to which the transmitting device belongs use.

Here, the method further comprises reporting change of the transmission power to an enhanced node B (eNB) if controlling the transmission power used in the at least one CCA process corresponding to the controlled CCA threshold value comprises changing the transmission power used in the at least one CCA process corresponding to the controlled CCA threshold value, and the transmitting device is a user equipment.

Here, reporting the change of the transmission power to the eNB comprises:

reporting the change of the transmission power to the eNB if change of downlink path loss measured in the user equipment is greater than or equal to a threshold value, reporting the change of the transmission power to the eNB if a predetermined first timer expires, reporting the change of the transmission power to the eNB if a predetermined second timer expires, the CCA threshold value is changed according to the expiration of the second timer, and the transmission power is changed according to the change of the CCA threshold value, or reporting the change of the transmission power to the eNB if the user equipment performs a transmitting operation according success of the CCA process, and changes a CCA threshold value and transmission power to a default CCA threshold value and default transmission power, respectively, according to performance of the transmitting operation.

Further, an apparatus according to an embodiment of the present disclosure is configured to perform the above method. According to various embodiments of the present disclosure, each of a transmitting device and a receiving device may be, for example, a user equipment (UE), and each of a transmitting device and a receiving device may be, for example, a base station. Here, the term user equipment may be interchangeable with the terms mobile station (MS), wireless terminal, mobile device, and/or the like. Here, the term base station may be interchangeable with the terms node B, evolved node B (eNB), evolved universal terrestrial radio access network (E-UTRAN) node B (eNB), access point (AP), and/or the like.

Based on LBT regulation applied to a unlicensed band, an enhanced node B (eNB) determines transmission power, and a CCA threshold value used for a transmitting device to determine a busy channel or a clear channel may be expressed as Equation 1.

$$\text{CCA threshold value} = -73 \text{ dBm/MHz} + 23 - \text{transmission power} \qquad \text{Equation 1}$$

For example, if a bandwidth of a unlicensed band is 20 MHz and transmission power of a transmitting device is 23 dBm, a CCA threshold value is set to −60 dBm. For another example, if the bandwidth of the unlicensed band is 20 MHz and the transmission power of the transmitting device is 30 dBm, the CCA threshold value is set to −67 dBm.

If an eNB is an LAA-LTE eNB, transmission power of the LAA-LTE eNB may be directly associated with a cell coverage.

Relation between transmission power and a CCA threshold value of an LAA-LTE eNB in a wireless communication system supporting a unlicensed band will be described with reference to FIGS. 4 to 6.

Figure 4:
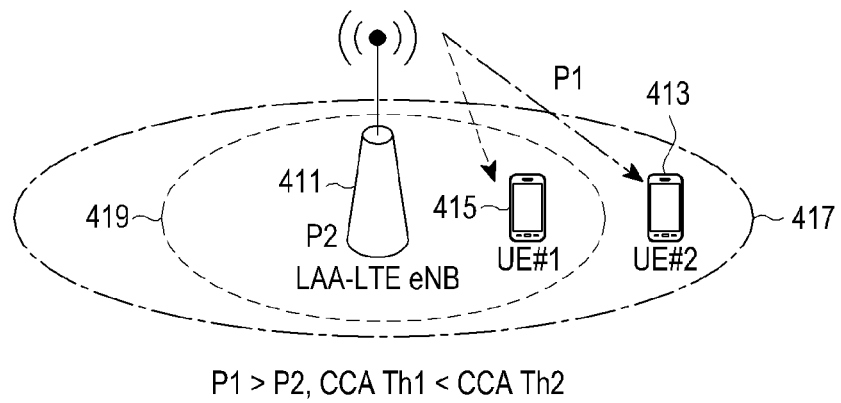
FIG. 4 schematically illustrates an example of relation between transmission power and a CCA threshold value of an LAA-LTE eNB in a wireless communication system supporting a unlicensed band.

FIG. 4 schematically illustrates an example of relation between transmission power and a CCA threshold value of an LAA-LTE eNB in a wireless communication system supporting a unlicensed band.

Referring to FIG. 4, the wireless communication system supporting the unlicensed band includes an LAA-LTE eNB 411, and a plurality of user equipments, e.g., two user equipments, i.e., a user equipment #1 413 and a user equipment #2 415.

The LAA-LTE eNB 411 may perform a transmitting operation using transmission power P1 or transmission power P2. Here, it will be assumed that a CCA threshold value used when transmission power of the LAA-LTE eNB 411 is P1 is CCA Th1 and a CCA threshold value used when transmission power of the LAA-LTE eNB 411 is P2 is CCA Th2. Here, the CCA Th1 may be expressed as Equation 2, and the CCA Th2 may be expressed as Equation 3.

$$CCA\ Th1=-73\ dBm/MHz+23-P1 \quad \text{Equation 2}$$

$$CCA\ Th2=-73\ dBm/MHz+23-P2 \quad \text{Equation 3}$$

Further, it will be assumed that the transmission power P1 is greater than the transmission power P2.

So, assuming like the above, relation of P1>P2 and CCA Th1<CCA Th2 is established.

It will be assumed that the user equipment #1 413 is located at a region #1 417, i.e., a region at which the user equipment #1 413 may successfully decode a received signal only if the LAA-LTE eNB 411 performs a transmitting operation using the transmission power P1, and the user equipment #2 415 is located at a region #2 419, i.e., a region at which the user equipment #2 415 may successfully decode a received signal if the LAA-LTE eNB 411 performs a transmitting operation using the transmission power P1 or the transmission power P2.

An example of relation between transmission power and a CCA threshold value of an LAA-LTE eNB in a wireless communication system supporting a unlicensed band has been described with reference to FIG. 4, and another example of relation between transmission power and a CCA threshold value of an LAA-LTE eNB in a wireless communication system supporting a unlicensed band will be described with reference to FIG. 5.

Figure 5:
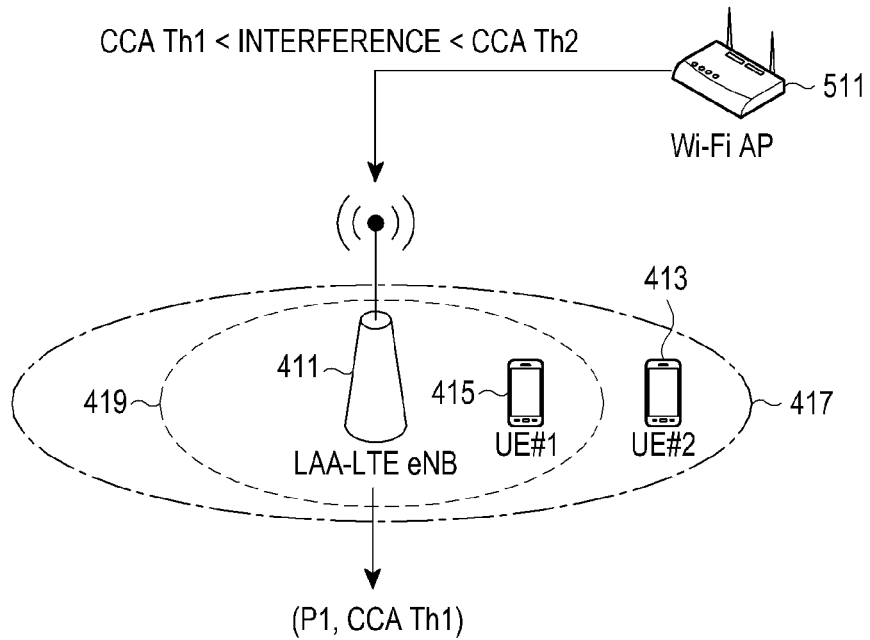
FIG. 5 schematically illustrates another example of relation between transmission power and a CCA threshold value of an LAA-LTE eNB in a wireless communication system supporting a unlicensed band.

FIG. 5 schematically illustrates another example of relation between transmission power and a CCA threshold value of an LAA-LTE eNB in a wireless communication system supporting a unlicensed band.

Referring to FIG. 5, the wireless communication system supporting the unlicensed band includes an LAA-LTE eNB 411, a user equipment #1 413, and a user equipment #2 415, and further includes a Wi-Fi AP 511. It will be assumed that the Wi-Fi AP 511 uses the same unlicensed band with the LAA-LTE eNB 411. Further, it will be assumed that assumption for transmission power and a CCA threshold value is the same as described in FIG. 4.

In this situation, a case that the Wi-Fi AP 511 exists around the LAA-LTE eNB 411, and the LAA-LTE eNB 411 receives interference which is greater than CCA Th1 and less than CCA Th2 from the Wi-Fi AP 511 (CCA Th1<strength of interference<CCA Th2) will be considered. In this case, if the LAA-LTE eNB 411 sets transmission power and a CCA threshold value to P1 and CCA Th1, respectively, the LAA-LTE eNB 411 currently receives interference greater than CCA Th1, so the LAA-LTE eNB 411 recognizes a busy channel and may not perform a transmitting operation for all of the user equipment #1 413 and the user equipment #2 415.

Another example of relation between transmission power and a CCA threshold value of an LAA-LTE eNB in a wireless communication system supporting a unlicensed band has been described with reference to FIG. 5, and still another example of relation between transmission power and a CCA threshold value of an LAA-LTE eNB in a wireless communication system supporting a unlicensed band will be described with reference to FIG. 6.

Figure 6:
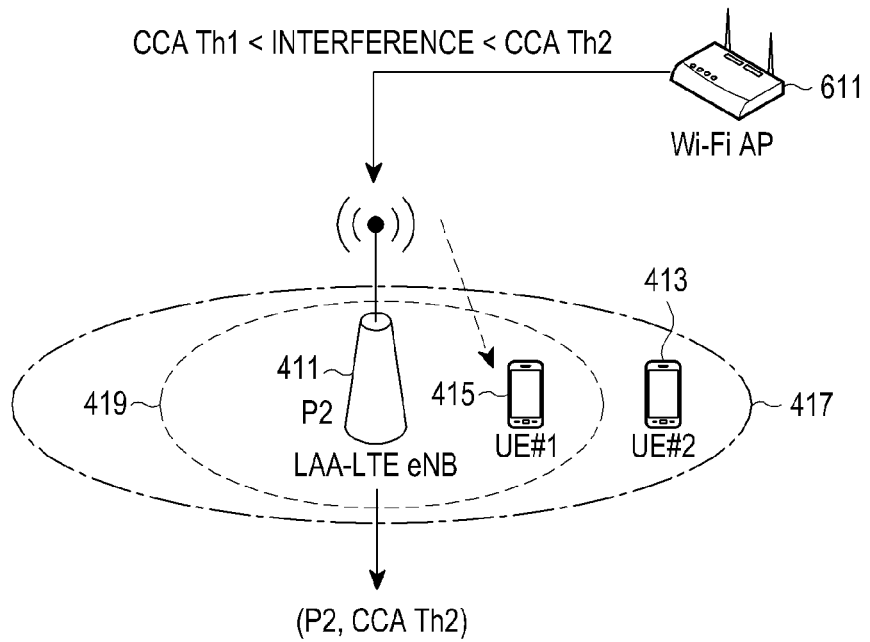
FIG. 6 schematically illustrates still another example of relation between transmission power and a CCA threshold value of an LAA-LTE eNB in a wireless communication system supporting a unlicensed band.

FIG. 6 schematically illustrates still another example of relation between transmission power and a CCA threshold value of an LAA-LTE eNB in a wireless communication system supporting a unlicensed band.

Referring to FIG. 6, the wireless communication system supporting the unlicensed band includes an LAA-LTE eNB 411, a user equipment #1 413, and a user equipment #2 415 as described in FIG. 4, and further includes a Wi-Fi AP 611. It will be assumed that the Wi-Fi AP 611 uses a unlicensed band identical to a unlicensed band used in the LAA-LTE eNB 411. It will be assumed that assumption of transmission power and a CCA threshold value is the same as described in FIG. 4.

In this situation, a case that the Wi-Fi AP 611 exists around the LAA-LTE eNB 411, and the LAA-LTE eNB 411 receives interference which is greater than CCA Th1 and less than CCA Th2 from the Wi-Fi AP 611 (CCA Th1<strength of interference<CCA Th2) will be considered. In this case, if the LAA-LTE eNB 411 sets transmission power and a CCA threshold value to P2 and CCA Th2, respectively, the LAA-LTE eNB 411 currently receives interference less than CCA Th2, so the LAA-LTE eNB 411 recognizes a clear channel and may perform a transmitting operation for the user equipment #2 415 located at a region #415.

As described with reference to FIGS. 4 to 6, a CCA threshold value affect various parameters such as transmission power, a channel state, e.g., a clear channel state and a busy channel state, a cell coverage, and/or the like of a transmitting device.

Specially, the CCA threshold value may affect transmission delay, and this will be described below.

In a case that a CCA threshold value is set relatively high, a transmitting device determines a corresponding channel as a clear channel even though there is relatively great interference, so there is a high probability that the transmitting device will acquire a transmission opportunity. So, if data to be transmitted occurs in the transmitting device, transmission delay which corresponds to time which is consumed for transmitting the data will be relatively short.

Alternatively, a case that a CCA threshold value is set relatively low, a transmitting device determines a corresponding channel as a busy channel even though there is relatively less interference, so there is a low probability that the transmitting device will acquire a transmission opportunity. So, if data to be transmitted occurs in the transmitting device, transmission delay will be relatively long.

As described above, it will be understood that a CCA threshold value significantly effects transmission delay which occurs upon data transmission.

Transmission delay according to success of a CCA process and failure of a CCA process in a wireless communication system supporting a unlicensed band will be described with reference to FIGS. 7 and 8.

Transmission delay according to success of a CCA process and failure of a CCA process in an FBE in a wireless communication system supporting a unlicensed band will be described with reference to FIG. 7.

Figure 7:
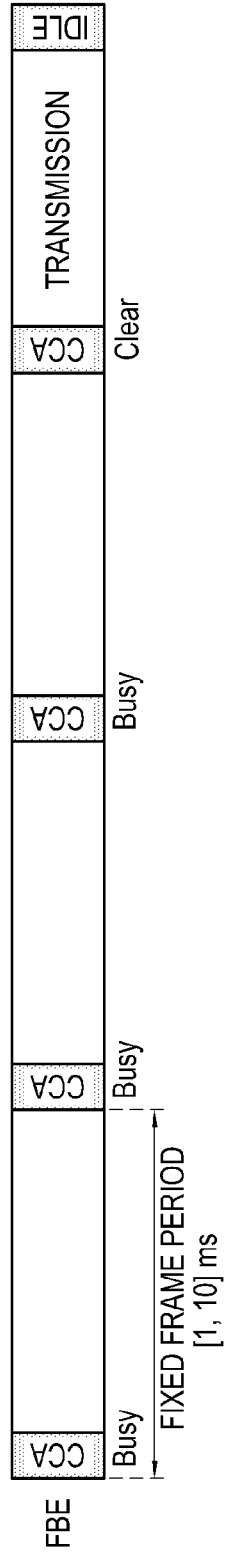
FIG. 7 schematically illustrates transmission delay according to success of a CCA process and failure of a CCA process in an FBE in a wireless communication system supporting a unlicensed band.

FIG. 7 schematically illustrates transmission delay according to success of a CCA process and failure of a CCA process in an FBE in a wireless communication system supporting a unlicensed band.

Referring to FIG. 7, an FBE may perform a CCA process by predetermined time, e.g., a fixed frame period. So, transmission delay which corresponds to a fixed frame period occurs whenever a CCA process fails after data to be transmitted in the FBE occurs.

A case that three CCA process failures occur after data to be transmitted in an FBE occurs, so transmission delay which corresponds to three times of a fixed frame period occurs is shown in FIG. 7.

Transmission delay according to success of a CCA process and failure of a CCA process in an FBE in a wireless communication system supporting a unlicensed band has been described with reference to FIG. 7, and transmission delay according to success of a CCA process and failure of a CCA process in an LBE in a wireless communication system supporting an unlicensed band will be described with reference to FIG. 8.

Figure 8:
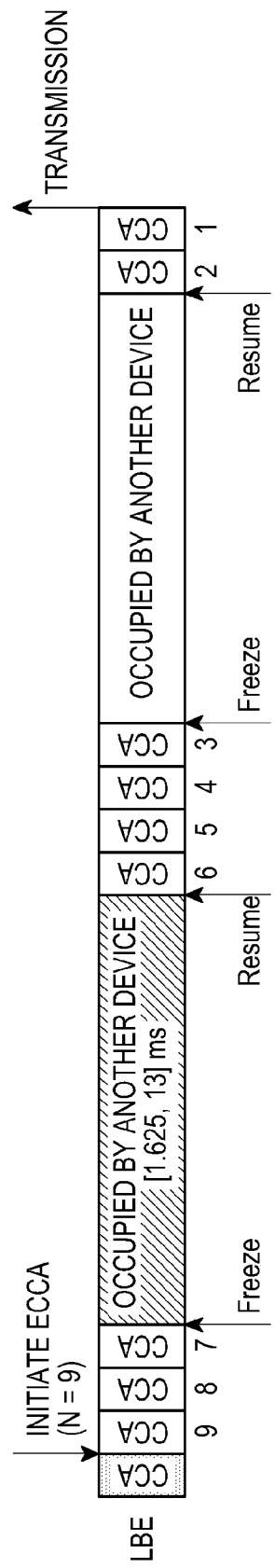
FIG. 8 schematically illustrates transmission delay according to success of a CCA process and failure of a CCA process in an LBE in a wireless communication system supporting an unlicensed band.

FIG. 8 schematically illustrates transmission delay according to success of a CCA process and failure of a CCA process in an LBE in a wireless communication system supporting an unlicensed band.

Referring to FIG. 8, an LBE may start a CCA process and an extended CCA (ECCA) process at an arbitrary timing while satisfying regulation for an idle period. Here, the ECCA process may include N CCA processes, and N is a value which is in [1, q], and a value which is randomly selected by the LBE. Further, q is a predetermined value.

So, upon detecting that another device occupies a unlicensed band while performing an ECCA process while decreasing a counter for counting N, the LBE performs an ECCA process again after waiting until the unlicensed band becomes a clear channel. Here, time during which the another device occupies the unlicensed band may be within time from 1.625 ms to 13 ms. The LBE may transmit data at a timing at which a value of the timer becomes 0.

So, transmission delay which corresponds to time consumed for an ECCA process and time during which another device occupies a unlicensed band occurs in the LBE.

FIG. 8 shows a case that data to be transmitted occurs in an LBE, the LBE selects 9 as a value of N, other devices occupy a unlicensed band twice, so transmission delay occurs, which corresponds to time consumed for performing 9 CCA processes and time during which the other devices occupy the unlicensed band twice.

As described in FIGS. 7 and 8, transmission delay which occurs in a unlicensed band significantly depends on various parameters such as a CCA threshold value, a channel state according to the CCA threshold value, e.g., a clear channel state and a busy channel state detection, transmission power of a transmitting device, a cell coverage, and/or the like.

This transmission delay significantly affects service quality which a subscriber experiences, so it is a very important issue to decrease transmission delay in a wireless communication system supporting a unlicensed band.

So, an embodiment of the present disclosure proposes a signal transmitting/receiving apparatus and method for enabling to decrease transmission delay which occurs in a unlicensed band by adaptively controlling a CCA threshold value whenever transmission delay which corresponds to predetermined time occurs in a wireless communication system supporting a unlicensed band.

An embodiment of the present disclosure proposes a signal transmitting/receiving apparatus and method for enabling to decrease transmission delay by increasing a probability that a transmitting operation will be performed, i.e., a probability that a clear channel will be detected by decreasing transmission power of a transmitting device and increasing a CCA threshold value in a case that the CCA threshold value is increased whenever transmission delay which corresponds to predetermined time occurs in a wireless communication system supporting a unlicensed band.

A process of adaptively controlling a CCA threshold value and transmission power in an FBE in a wireless communication system supporting a unlicensed band will be described with reference to FIG. 9.

Figure 9:
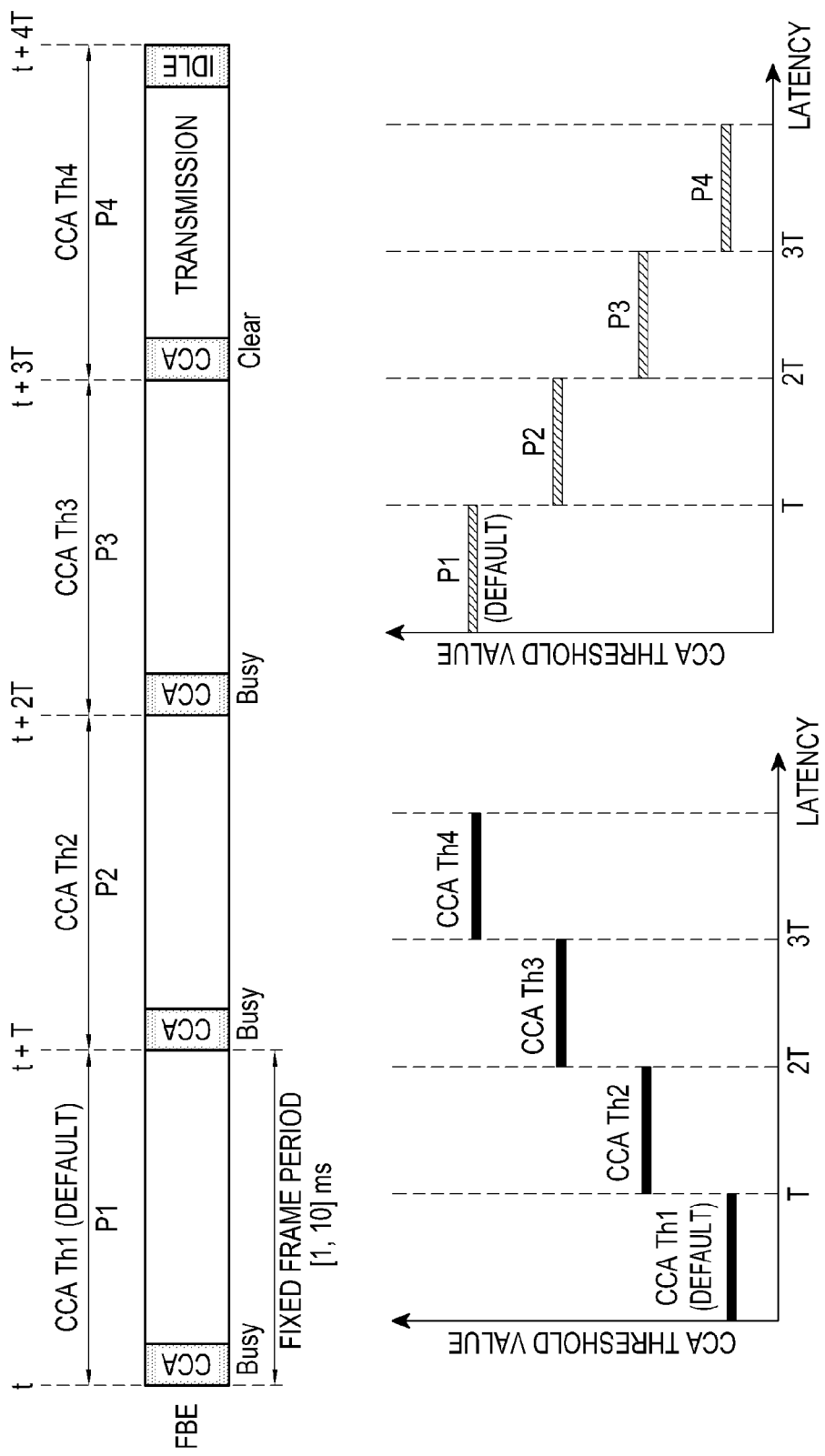
FIG. 9 schematically illustrates a process of adaptively controlling a CCA threshold value and transmission power in an FBE in a wireless communication system supporting a unlicensed band.

FIG. 9 schematically illustrates a process of adaptively controlling a CCA threshold value and transmission power in an FBE in a wireless communication system supporting a unlicensed band.

Referring to FIG. 9, an FBE increases a CCA threshold value by a preset value every transmission delay which occurs whenever a CCA process is failed once, i.e., every fixed frame period. It will be noted that a fixed frame period is expressed as "T" in FIG. 9.

In FIG. 9, the first CCA process uses CCA Th1 as a CCA threshold value, the second CCA process uses CCA Th2 as a CCA threshold value, and the third CCA process uses CCA Th3 as a CCA threshold value. Here, the CCA Th1 is a default CCA threshold value used in the FBE, and there is relation of CCA Th1<CCA Th2<CCA Th3 among the CCA Th1, the CCA Th2, and the CCA Th3. The CCA threshold value may be determined based on various parameters, and an operation of determining the CCA threshold value will be described with reference to FIGS. 11 to 15, and a detailed description thereof will be omitted herein.

The first CCA process uses transmission power P1 which corresponds to the CCA threshold value CCA Th1, the second CCA process uses transmission power P2 which corresponds to the CCA threshold value CCA Th2, and the third CCA process uses transmission power P3 which corresponds to the CCA threshold value CCA Th3. Here, there is relation of P1>P2>P3 among P1, P2, and P3.

If the FBE fails in all of the first CCA process to the third CCA process, the FBE performs the fourth CCA process using a CCA threshold value CCA Th4. If the fourth CCA process is successful, the FBE performs a transmitting operation using transmission power P4 as transmission power which corresponds to the CCA threshold value CCA Th4.

Like this, if a CCA process is successful, the FBE changes a CCA threshold value to CCA Th1 as the default CCA threshold value, and changes transmission power to transmission power P1 which corresponds to the CCA threshold value CCA Th1.

A process of adaptively controlling a CCA threshold value and transmission power in an FBE in a wireless communication system supporting a unlicensed band has been described with reference to FIG. 9, and a process of adaptively controlling a CCA threshold value and transmission power in an LBE in a wireless communication system supporting a unlicensed band will be described with reference to FIG. 10.

Figure 10:
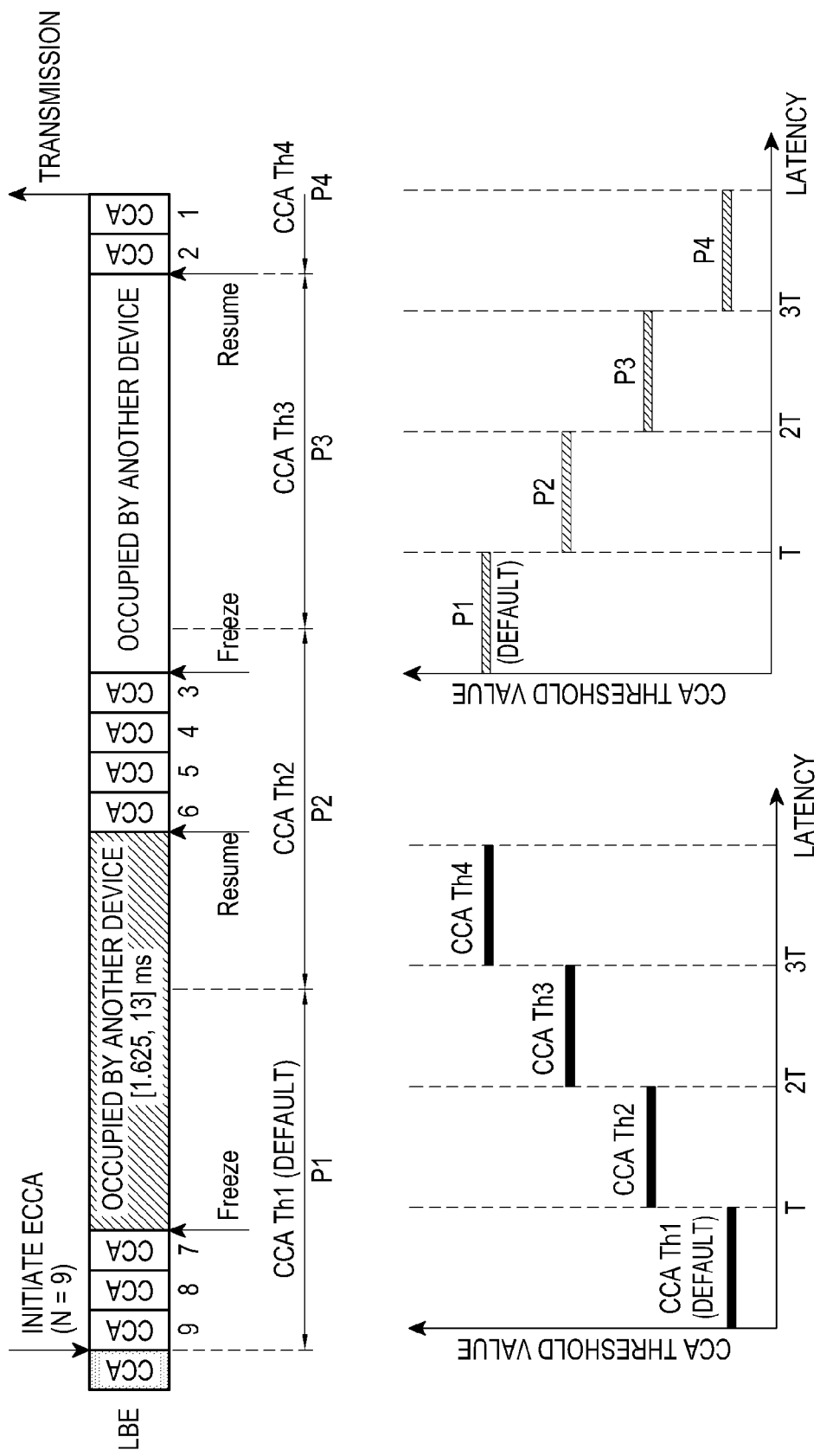
FIG. 10 schematically illustrates a process of adaptively controlling a CCA threshold value and transmission power in an LBE in a wireless communication system supporting a unlicensed band.

FIG. 10 schematically illustrates a process of adaptively controlling a CCA threshold value and transmission power in an LBE in a wireless communication system supporting a unlicensed band.

Referring to FIG. 10, it will be assumed that an LBE selects N as the number of CCA processes included in an ECCA process to 9. In this case, the LBE performs a transmitting operation after performing total 9 CCA processes. If another device other than the LBE, e.g., a Wi-Fi AP occupies a unlicensed band after the LBE performs 3 CCA processes (that is, if a value of a counter is 6 (counter=6)), the LBE stops a counting operation for the number of performed CCA processes and monitors a channel state. Here, time during which the another device occupies the unlicensed band may be within time from 1.625 ms to 13 ms. The LBE starts counting a fixed frame period "T" at a timing at which the LBE starts monitoring the channel state.

Upon detecting the fixed frame period "T" elapses while monitoring a channel state, the LBE changes a CCA threshold value from CCA Th1 as a default CCA threshold value to CCA Th2 as a CCA threshold value which is increased by a predetermined value from CCA Th1.

In this way, a transmitting operation is performed using a CCA threshold value and transmission power applied to a timing at which the ninth CCA process as the last CCA process has been completed (that is, a value of a counter is zero (0) (counter=0)). FIG. 10 shows a case that the LBE performs a transmitting operation using CCA threshold value CCA Th4 and transmission power P4.

A process of adaptively controlling a CCA threshold value and transmission power in an LBE in a wireless communication system supporting a unlicensed band has been described with reference to FIG. 10, and a process of adaptively controlling a CCA threshold value in a transmitting device in a wireless communication system supporting a unlicensed band will be described with reference to FIGS. 11 to 15.

Figure 11:
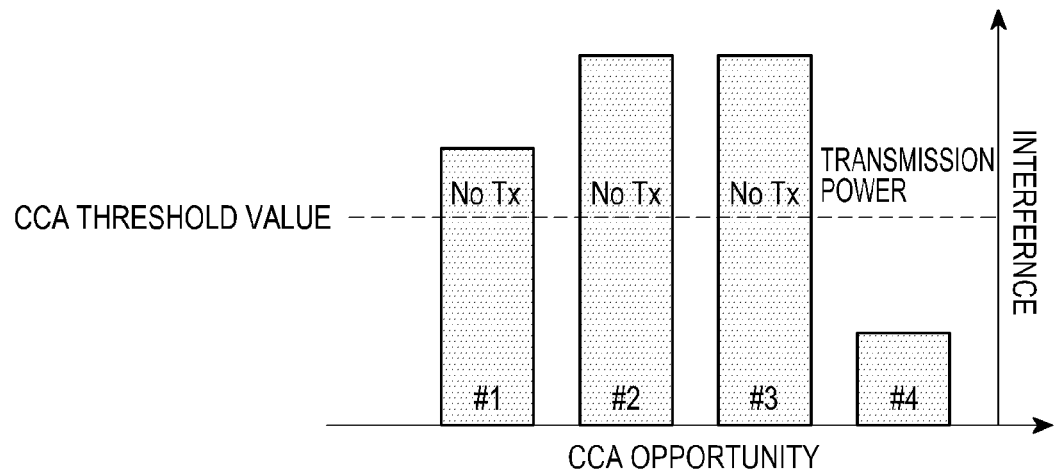
FIG. 11 schematically illustrates an example of a process of adaptively controlling a CCA threshold value in a transmitting device in a wireless communication system supporting a unlicensed band.

FIG. 11 schematically illustrates an example of a process of adaptively controlling a CCA threshold value in a transmitting device in a wireless communication system supporting a unlicensed band.

Referring to FIG. 11, a transmitting device may control a CCA threshold value such that a fixed CCA threshold value is used every opportunity at which a CCA process may be performed. For convenience, an opportunity at which a CCA process is performable will be referred to as "CCA opportunity.

As shown in FIG. 11, in a case that a CCA threshold value is controlled such that a fixed CCA threshold value is used every CCA opportunity, a transmitting device may not perform a transmitting operation at a CCA opportunity #1 to a CCA opportunity #3, but may perform a transmitting operation at a CCA opportunity #4. That is, strength of interference in a unlicensed band is greater than the CCA threshold value at the CCA opportunity #1 to the CCA opportunity #3, so the transmitting device may not perform a transmitting operation.

A process of adaptively controlling a CCA threshold value in a transmitting device in a wireless communication system supporting a unlicensed band has been described with reference to FIG. 11, and another example of a process of adaptively controlling a CCA threshold value in a transmitting device in a wireless communication system supporting a unlicensed band will be described with reference to FIG. 12.

Figure 12:
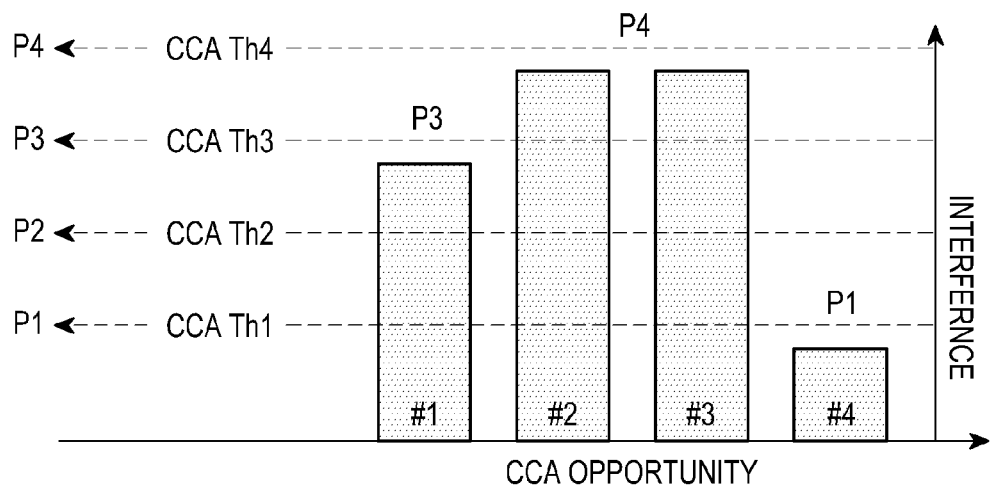
FIG. 12 schematically illustrates another example of a process of adaptively controlling a CCA threshold value in a transmitting device in a wireless communication system supporting a unlicensed band.

FIG. 12 schematically illustrates another example of a process of adaptively controlling a CCA threshold value in a transmitting device in a wireless communication system supporting a unlicensed band.

Referring to FIG. 12, a transmitting device may control a CCA threshold value such that a plurality of CCA threshold values, e.g., total 4 CCA threshold values CCA Th1 to CCA Th4 are used every CCA opportunity.

So, the transmitting device compares strength of interference detected in the transmitting device with the 4 CCA threshold values every CCA opportunity. The transmitting device determines whether there is a CCA threshold value which is greater than the strength of the interference detected in the transmitting device based on the compared result. If there is the CCA threshold value which is greater than the strength of the interference detected in the transmitting device, the transmitting device determines the CCA threshold value which is greater than the strength of the interference detected in the transmitting device as a CCA threshold value to be used in the transmitting device, determines whether to perform a transmitting operation based on the determined CCA threshold value, and determines transmission power of the transmitting device based on the determined CCA threshold value.

If there are CCA threshold values which are greater than the strength of the interference detected in the transmitting device, the transmitting device determines a minimal CCA threshold value among the CCA threshold values which are greater than the strength of the interference detected in the transmitting device as a CCA threshold value to be used in the transmitting device, and determines transmission power of the transmitting device based on the determined CCA threshold value.

As shown in FIG. 12, in a case that a CCA threshold value is controlled such that a plurality of CCA threshold values are used every CCA opportunity, a transmitting device performs a CCA process and a transmitting operation using CCA Th3 and transmission power 3 at a CCA opportunity #1, performs a CCA process and a transmitting operation using CCA Th4 and transmission power 4 at a CCA opportunity #2 to a CCA opportunity #3, and performs a CCA process and a transmitting operation using CCA Th1 and transmission power 1 at a CCA opportunity #4.

Another process of adaptively controlling a CCA threshold value in a transmitting device in a wireless communication system supporting a unlicensed band has been described with reference to FIG. 12, and still another example of a process of adaptively controlling a CCA threshold value in a transmitting device in a wireless communication system supporting a unlicensed band will be described with reference to FIG. 13.

Figure 13:
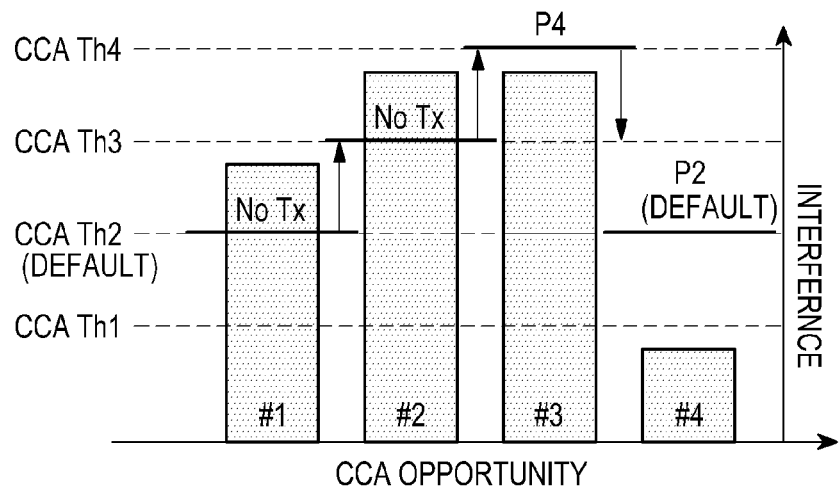
FIG. 13 schematically illustrates still another example of a process of adaptively controlling a CCA threshold value in a transmitting device in a wireless communication system supporting a unlicensed band.

FIG. 13 schematically illustrates still another example of a process of adaptively controlling a CCA threshold value in a transmitting device in a wireless communication system supporting a unlicensed band.

Referring to FIG. 13, a transmitting device uses one CCA threshold value every CCA opportunity, and may control a CCA threshold value by adaptively changing the CCA threshold value every CCA opportunity.

A transmitting device uses CCA Th2 as a default CCA threshold value at CCA opportunity #1. If interference less than the CCA Th2 is detected, the transmitting device performs a transmitting operation using transmission power which corresponds to the CCA Th2.

If interference greater than the CCA Th2 is detected, the transmitting device does not perform a transmitting operation and will use CCA Th3 as a CCA threshold value which is greater than the CCA Th2 at the next CCA opportunity. If interference less than or equal to the CCA Th3 is detected, the transmitting device performs a transmitting operation using transmission power which corresponds to the CCA Th3. If interference greater than the CCA Th3 is detected, the transmitting device does not perform a transmitting operation and will use CCA Th4 as a CCA threshold value which is greater than the CCA Th3 at the next CCA opportunity.

If the transmitting device performs a signal transmitting operation according to detection of interference which is less than a set CCA threshold value while performing the operation described above, the transmitting device may use a default CCA threshold value at the next CCA opportunity.

Still Another process of adaptively controlling a CCA threshold value in a transmitting device in a wireless communication system supporting a unlicensed band has been described with reference to FIG. 13, and still another example of a process of adaptively controlling a CCA threshold value in a transmitting device in a wireless communication system supporting a unlicensed band will be described with reference to FIG. 14.

Figure 14:
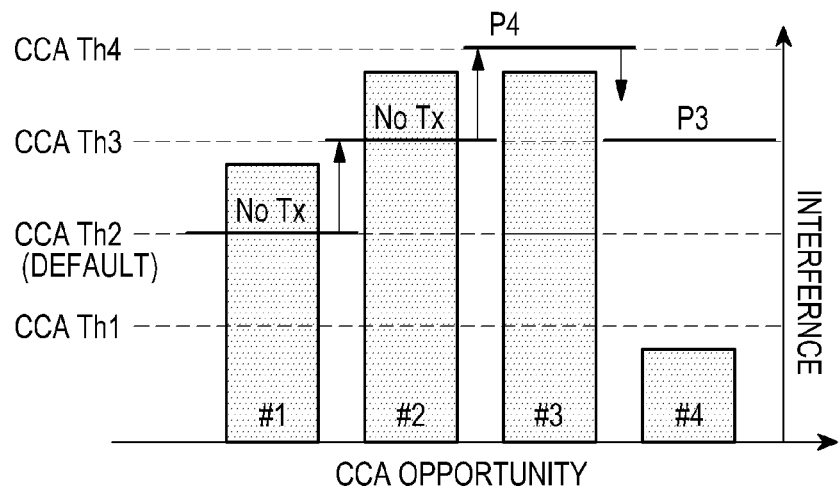
FIG. 14 schematically illustrates still another example of a process of adaptively controlling a CCA threshold value in a transmitting device in a wireless communication system supporting a unlicensed band.

FIG. 14 schematically illustrates still another example of a process of adaptively controlling a CCA threshold value in a transmitting device in a wireless communication system supporting a unlicensed band.

Referring to FIG. 14, a transmitting device may use one CCA threshold value every CCA opportunity, and control a CCA threshold value by adaptively changing the CCA threshold value every CCA opportunity.

Firstly, a transmitting device uses a default CCA threshold value CCA Th2 at a CCA opportunity #1. If interference less than the CCA Th2 is detected, the transmitting device 2 performs a transmitting operation using transmission power which corresponds to the CCA Th2.

If interference greater than the CCA Th2 is detected, the transmitting device does not perform a transmitting operation, and will use CCA Th3 as a CCA threshold value greater than the CCA Th2 at the next CCA opportunity. If interference less than or equal to the CCA Th3 is detected, the transmitting device performs a transmitting operation using transmission power which corresponds to the CCA Th3.

If interference greater than the CCA Th3 is detected, the transmitting device does not perform a transmitting operation, and will use CCA Th4 as a CCA threshold value greater than the CCA Th3 at the next CCA opportunity.

If the transmitting device performs a signal transmitting operation according to detection of interference which is less than a set CCA threshold value while performing the operation described above, the transmitting device may use a CCA threshold value, e.g., CCA Th3, which is decreased by a preset level, e.g., 1 level from a CCA threshold value, e.g., CCA Th4 used for performing the transmitting operation at the next CCA opportunity.

Meanwhile, a CCA opportunity as described in FIGS. 11 to 14 may one CCA slot or a set of a plurality of CCA slots. The plurality of CCA slots may be continuous or discontinuous. Although not described, the set of the plurality of CCA slots may be implemented with various forms.

Still another process of adaptively controlling a CCA threshold value in a transmitting device in a wireless communication system supporting a unlicensed band has been described with reference to FIG. 14, and still another example of a process of adaptively controlling a CCA threshold value in a transmitting device in a wireless communication system supporting a unlicensed band will be described with reference to FIG. 15.

Figure 15:
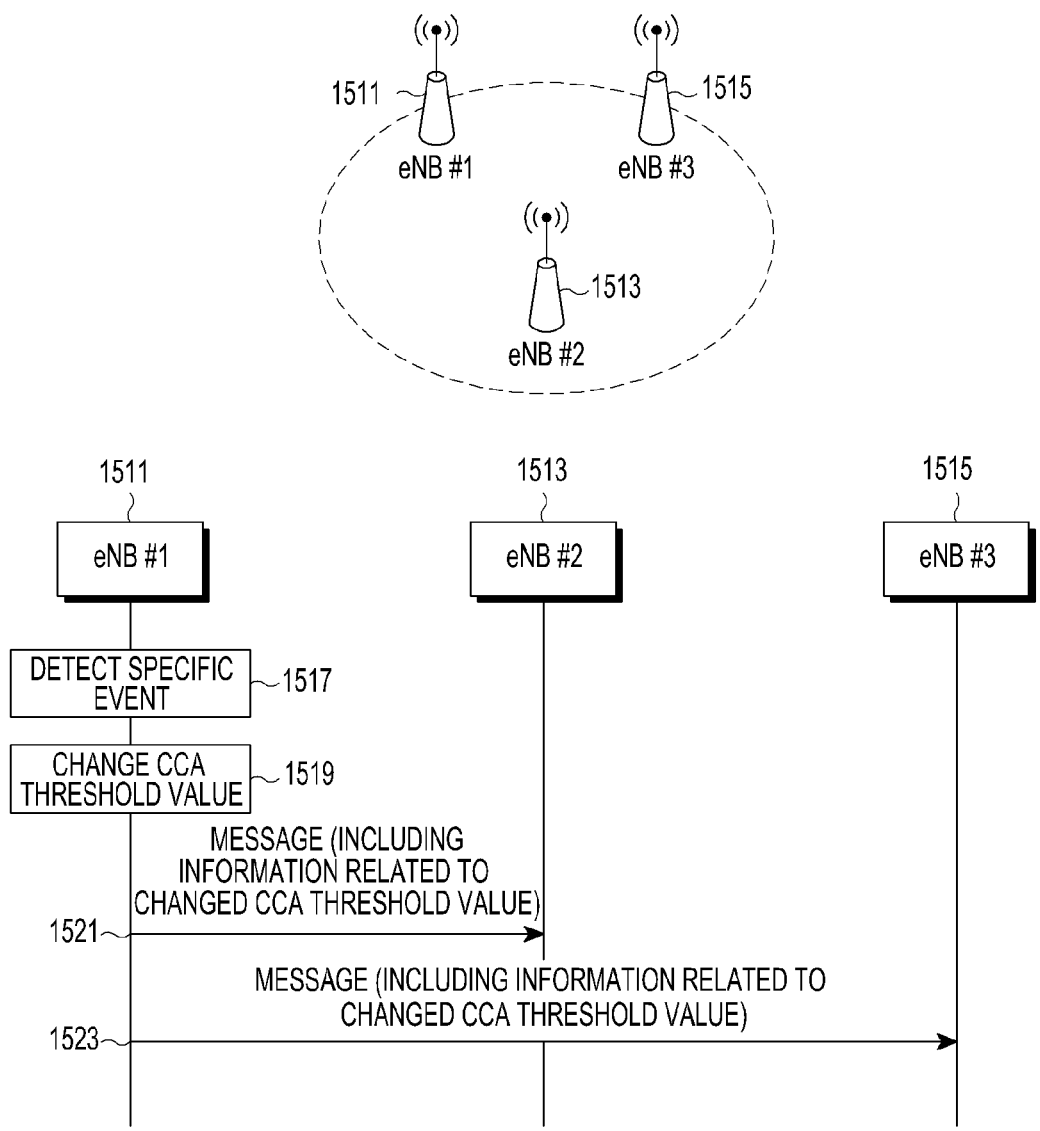
FIG. 15 schematically illustrates still another example of a process of adaptively controlling a CCA threshold value in a transmitting device in a wireless communication system supporting a unlicensed band.

FIG. 15 schematically illustrates still another example of a process of adaptively controlling a CCA threshold value in a transmitting device in a wireless communication system supporting a unlicensed band.

Referring to FIG. 15, a plurality of transmitting devices may control a CCA threshold value by commonly changing a CCA threshold value. In FIG. 15, it will be assumed that each of the transmitting devices is an eNB, so the plurality of transmitting devices include an eNB #1 1511, an eNB #2 1513, and an eNB #1 1515. The eNB #1 1511, the eNB #2 1513, and the eNB #1 1515 are included in the same group, and it will be assumed that each of the eNB #1 1511, the eNB #2 1513, and the eNB #1 1515 included in the same group uses the same CCA threshold value.

In a case that there is a need for changing a CCA threshold value according that the eNB #1 1511 detects a specific event (at operation 1517), the eNB #1 1511 changes the CCA threshold value (at operation 1519). A scheme of changing the CCA threshold value is the same as described above, and a detailed description thereof will be omitted herein. The specific event which may detect the need for changing the CCA threshold value will be described below, and a detailed description thereof will be omitted herein.

The eNB #1 1511 transmits a message including information related to the changed CCA threshold value to each of eNBs, i.e., the eNB #2 1513 and the eNB #1 1515 included in a group identical to a group in which the eNB #1 1511 is included (at operations 1521 and 1523). The information related to the changed CCA threshold value may be implemented with various forms, and a detailed description thereof will be omitted herein. The message including the information related to the changed CCA threshold value may be implemented with various forms, and a detailed description thereof will be omitted herein.

The specific event will be described below.

The specific event denotes an event causing change of a CCA threshold value, and the specific event may be one of the following events.

(1) A case that the number of automatic repeat request (ARQ) acknowledgments (ACKs) for data transmitted through a unlicensed band during predetermined time or the number of ARQ non-acknowledgments (NACKs) for the data transmitted through the unlicensed band during the predetermined time is greater than or equal to a predetermined threshold value or less than or equal to the predetermined threshold value.

(2) A case that the number of hybrid automatic repeat request (HARQ) ACKs for data transmitted through a unlicensed band during predetermined time or the number of HARQ NACKs for the data transmitted through the unlicensed band during the predetermined time is greater than or equal to a predetermined threshold value or less than or equal to the predetermined threshold value.

(3) A case that throughput for data transmitted through a unlicensed band during predetermined time is greater than or equal to predetermined threshold throughput or less than or equal to the predetermined threshold throughput.

(4) A case that average latency for data transmitted through a unlicensed band during predetermined time is greater than or equal to predetermined threshold latency or less than or equal to the predetermined threshold latency.

(5) A case that the number of CCA slots on a clear channel state among CCA processes performed in a unlicensed band during predetermined time is greater than or equal to a predetermined threshold value or less than or equal to the predetermined threshold value.

(6) A case that the number of CCA slots on a busy channel state among CCA processes performed in a unlicensed band during predetermined time is greater than or equal to a predetermined threshold value or less than or equal to the predetermined threshold value.

(6) A case that time during which a transmitting device occupies an unlicensed band during predetermined time is greater than or equal to predetermined threshold time or less than or equal to the predetermined threshold time.

(7) A case that time during which a transmitting device does not occupy a unlicensed band during predetermined time is greater than or equal to predetermined threshold time or less than or equal to the predetermined threshold time.

(8) A case that average signal strength from an LAA-LTE eNB measured in a unlicensed band during predetermined time is greater than or equal to predetermined threshold signal strength or less than or equal to the predetermined threshold signal strength.

Here, signal strength may be, for example, at least one of received signal code power (RSCP), reference signal received power (RSRP), an reference signal strength indicator (RSSI), reference signal received quality (RSRQ), a carrier-to-interference noise ratio (CINR), a signal-to-noise ratio (SNR), a block error rate (BLER), and/or the like.

(9) A case that average signal strength from a Wi-Fi AP and a user equipment measured in a unlicensed band during predetermined time is greater than or equal to predetermined threshold signal strength or less than or equal to the predetermined threshold signal strength.

(10) A case that average signal strength from an LAA-LTE eNB, a Wi-Fi AP, and a user equipment measured in a unlicensed band during predetermined time is greater than or equal to predetermined threshold signal strength or less than or equal to the predetermined threshold signal strength.

(11) A case that average signal strength from an inter-operator LAA-LTE eNB measured in a unlicensed band during predetermined time is greater than or equal to predetermined threshold signal strength or less than or equal to the predetermined threshold signal strength.

(12) A case that an average buffer occupancy rate of an eNB measured in a unlicensed band during predetermined time is greater than or equal to predetermined threshold buffer occupancy rate or less than or equal to the predetermined threshold buffer occupancy rate.

(13) A case of receiving a predefined signal from neighbor LAA-LTE eNBs in a unlicensed band.

Here, the predefined signal may include at least one of information related to a CCA threshold value, information related to a timing at which a CCA threshold value is applied, information related a public land mobile network (PLMN) Identifier (ID), and/or the like.

(14) A case that the number of times that a user equipment experiences channel quality information (CQI) mismatch in a unlicensed band during predetermined time is greater than or equal to a predetermined threshold value or less than or equal to the predetermined threshold value.

The specific event may be applied to all operations performed in a wireless communications system supporting a unlicensed band according to an embodiment of the present disclosure as well as FIG. 15.

Still another process of adaptively controlling a CCA threshold value in a transmitting device in a wireless communication system supporting a unlicensed band has been described with reference to FIG. 15, and an operating process of a transmitting device in a wireless communication system supporting a unlicensed band according to an embodiment of the present disclosure will be described with reference to FIG. 16.

Figure 16:
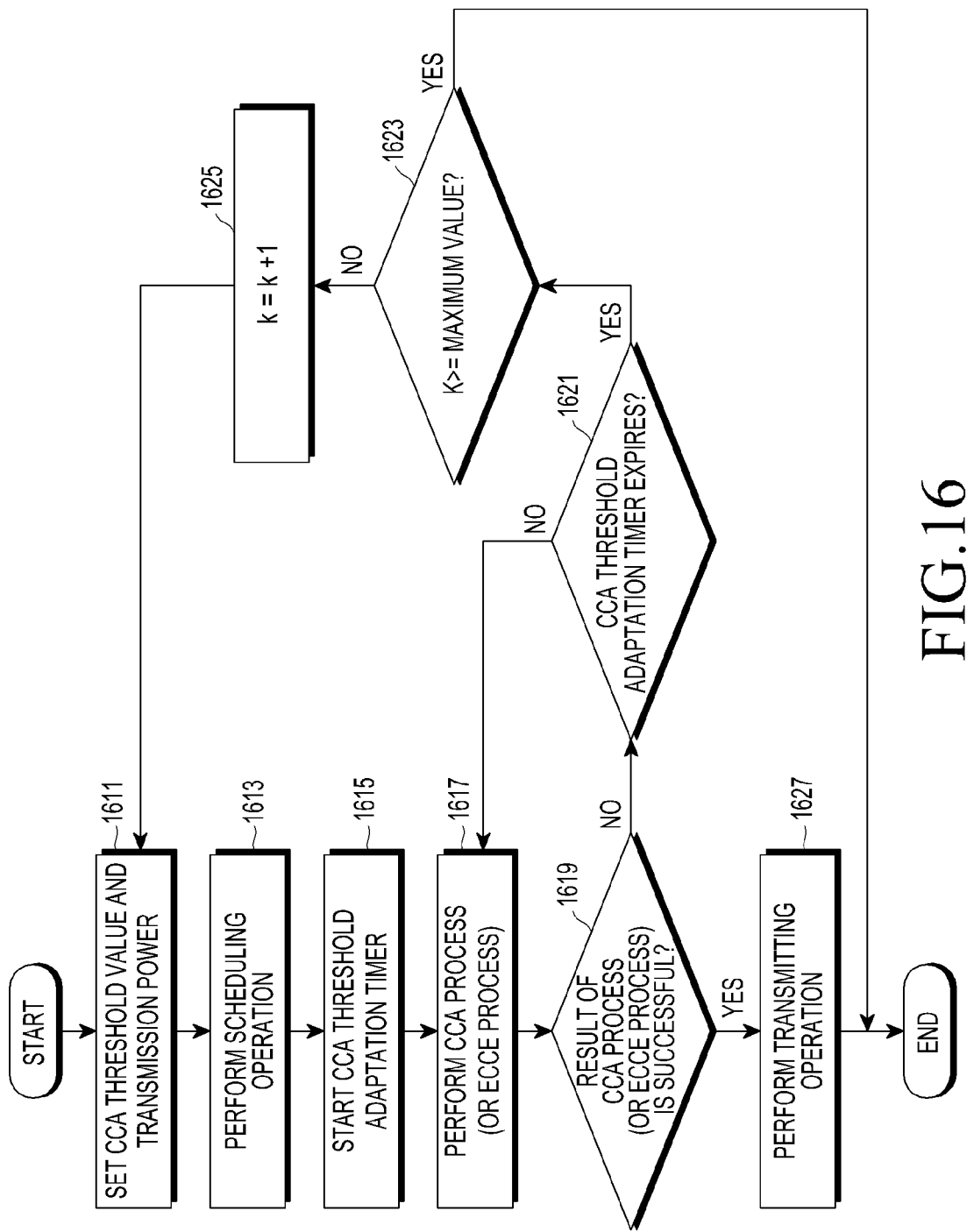
FIG. 16 schematically illustrates an operating process of a transmitting device in a wireless communication system supporting a unlicensed band according to an embodiment of the present disclosure.

FIG. 16 schematically illustrates an operating process of a transmitting device in a wireless communication system supporting a unlicensed band according to an embodiment of the present disclosure.

Prior to description of FIG. 16, as proposed in an embodiment of the present disclosure, a transmitting device, e.g., an eNB may perform a transmitting operation even though there is relatively large interference upon increasing a CCA threshold value whenever predetermined transmission delay occurs, so a transmission probability of the transmitting device may be increased.

However, usable transmission power also decreases according to increase of the CCA threshold value, so a cell coverage may decrease. For example, as described in FIGS. 4 to 6, if transmission power is decreased from P1 to P2 according that a CCA threshold value is increased from CCA Th1 to CCA Th2, an eNB 411 needs to exclude a receiving device such as a user equipment #1 413 which may successfully decode a signal only when using the transmission power P1 from a scheduling target. That is, the eNB 411 needs to perform a scheduling operation again according to change of a CCA threshold value.

As described above, a transmitting device, i.e., an eNB needs to perform a scheduling operation according to change of a CCA threshold value, and this will be described below.

Firstly, the eNB sets a CCA threshold value and transmission power at operation 1611 and proceeds to operation 1613. That is, the eNB sets the CCA threshold value to CCA Thk, and sets the transmission power to Pk which corresponds to the CCA Thk. Here, k is an index indicating a CCA threshold value and a transmission power level, and the CCA Thk and the Pk are initially set to CCA Th1 as a default CCA threshold value and P1 as default transmission power, respectively.

At operation 1613, the eNB selects a receiving device, i.e., a user equipment based on the transmission power P1, that is, the eNB performs a scheduling operation, generates data to be transmitted to the selected user equipment, and proceeds to operation 1615. The eNB starts a CCA threshold adaptation timer at operation 1615, and proceeds to operation 1617. Here, the CCA threshold adaptation timer is a timer for counting time during which a CCA threshold value is maintained. The eNB performs a CCA process (or an ESSA process) at operation 1617, and proceeds to operation 1619. The eNB determines whether a result of the CCA process (or the ESSA process) is success at operation 1619.

If the result of the CCA process (or the ESSA process) is not the success, that is, if result of the CCA process (or the ESSA process) is failure, the eNB proceeds to operation 1621. The eNB determines whether the CCA threshold adaptation timer expires at operation 1621. If the CCA threshold adaptation timer does not expire, the eNB returns to operation 1617.

If the CCA threshold adaptation timer expires, the eNB proceeds to operation 1623. The eNB determines whether the index k is greater than or equal to a maximum value at operation 1623. If the index k is not greater than or equal to the maximum value at operation 1623, the eNB proceeds to operation 1625. The transmitting device increases the index k by a preset value, e.g., 1 at operation 1625, and returns to operation 1611

If the index k is greater than or equal to the maximum value at operation 1623, the eNB terminates the operation performed to now since the eNB may not change a CCA threshold value and transmission power.

If the result of the CCA process (or the ECCA process) is success at operation 1619, the eNB proceeds to operation 1627. The eNB performs a transmitting operation at operation 1627.

Although FIG. 16 illustrates an operating process of a transmitting device in a wireless communication system supporting a unlicensed band according to an embodiment of the present disclosure, various changes could be made to FIG. 16. For example, although shown as a series of operations, various operations in FIG. 16 could overlap, occur in parallel, occur in a different order, or occur multiple times.

As described above, an embodiment of the present disclosure proposes a scheme for adaptively controlling a CCA threshold value for preventing transmission delay due to CCA failure in an LAA-LTE mobile communication system supporting a unlicensed band. A scheme for adaptively controlling a CCA threshold value has been described with reference to, for example, an operation which is based on a downlink (DL), i.e., an operation in which an eNB performs a CCA process and transmits data to a user equipment if a result of the CCA process is success.

A scheme for adaptively controlling a CCA threshold value proposed in an embodiment of the present disclosure may be applied to a uplink (UL) as well as a DL. That is, an operation which is based on a UL, i.e., an operation in which a user equipment performs a CCA process and transmits data to an eNB if a result of the CCA process is success may be possible.

Meanwhile, in a wireless communication system supporting a unlicensed band according to an embodiment of the present disclosure, if a CCA threshold value is increased, transmission power decreases, according to an LBT regulation process. In this case, transmission power of a user equipment decreases in an operation which is based on a UL, an eNB performs a UL scheduling operation based on transmission power of a user equipment in an LTE mobile communication system, so the eNB needs to trace change of the transmission power of the user equipment.

However, only a transmitting device, i.e., a user equipment knows success or failure of a CCA process, so the user equipment needs to report change of transmission power of the user equipment to an eNB.

This transmission power change report may be performed based on a power headroom report (PHR) operation proposed in a current LTE mobile communication system.

Table 1 shows power headroom information proposed in a current LTE mobile communication system.

TABLE 1

| Reported Value | Measured quantity value (dB) |
|---|---|
| POWER_HEADROOM_0 | $-23 \leq PH < -22$ |
| POWER_HEADROOM_1 | $-22 \leq PH < -21$ |
| POWER_HEADROOM_2 | $-21 \leq PH < -20$ |
| POWER_HEADROOM_3 | $-20 \leq PH < -19$ |
| POWER_HEADROOM_4 | $-19 \leq PH < -18$ |
| POWER_HEADROOM_5 | $-18 \leq PH < -17$ |
| ... | ... |
| POWER_HEADROOM_57 | $34 \leq PH < 35$ |
| POWER_HEADROOM_58 | $35 \leq PH < 36$ |
| POWER_HEADROOM_59 | $36 \leq PH < 37$ |
| POWER_HEADROOM_60 | $37 \leq PH < 38$ |
| POWER_HEADROOM_61 | $38 \leq PH < 39$ |
| POWER_HEADROOM_62 | $39 \leq PH < 40$ |
| POWER_HEADROOM_63 | $PH \geq 40$ |

As shown in Table 1, power headroom information includes a reported value and a measured quantity value. Here, the reported value supports total 64 power headroom indexes, i.e., POWER_HEADROOM_0 to POWER_HEADROOM_63. Each of the 64 power headroom indexes is mapped to a corresponding measured quantity value. For example, a measured quantity value which is greater than or equal to −23 dB or less than −22 dB is mapped to POWER_HEADROOM_0.

Meanwhile, in a current LTE mobile communication system, a user equipment reports the power headroom information to an eNB if the following event occurs. That is, the user equipment performs a PHR operation if the following event occurs.

(1) A case that change of DL path loss measured in a user equipment is greater than or equal to a predetermined threshold value, e.g., a dl-PathlossChange value defined in the LTE mobile communication system.

(2) A case that a predetermined timer, e.g., PeriodicPHR-Timer defined in the LTE mobile communication system expires (a PHR operation is periodically performed), where PeriodicPHR-Timer is a timer for counting a period by which a PHR operation is performed.

As described above, in a current LTE mobile communication system, a PHR operation is performed if DL path loss changes beyond a predetermined threshold value and a predetermined timer expires.

So, an embodiment of the present disclosure further proposes a scheme in which a PHR operation may be performed based on change of transmission power according to change of a CCA threshold value. That is, an embodiment of the present disclosure adds change of transmission power according to change of a CCA threshold value as a specific event which is a trigger for performing a PHR operation.

So, in an embodiment of the present disclosure, a user equipment performs a PHR operation if at least one of the following four events occurs.

(1) A case that change of DL path loss measured in a user equipment is greater than or equal to a predetermined threshold value, e.g., a dl-PathlossChange value defined in an LTE mobile communication system.

(2) A case that a predetermined timer, e.g., PeriodicPHR-Timer defined in the LTE mobile communication system expires (a PHR operation is periodically performed).

(3) A case that a CCA threshold value is changed according to expiration of a predetermined timer, e.g., a CCA threshold adaptation timer and transmission power is changed according to the change of the CCA threshold value.

(4) A case that a user equipment performs a transmitting operation, that is, the user equipment successfully transmits UL data, and sets a CCA threshold value and transmission power to a default CCA threshold value and default transmission power, respectively.

A process of transmitting/receiving a signal between a user equipment and an eNB in a wireless communication system supporting a unlicensed band according to an embodiment of the present disclosure will be described with reference to FIG. 17.

Figure 17:
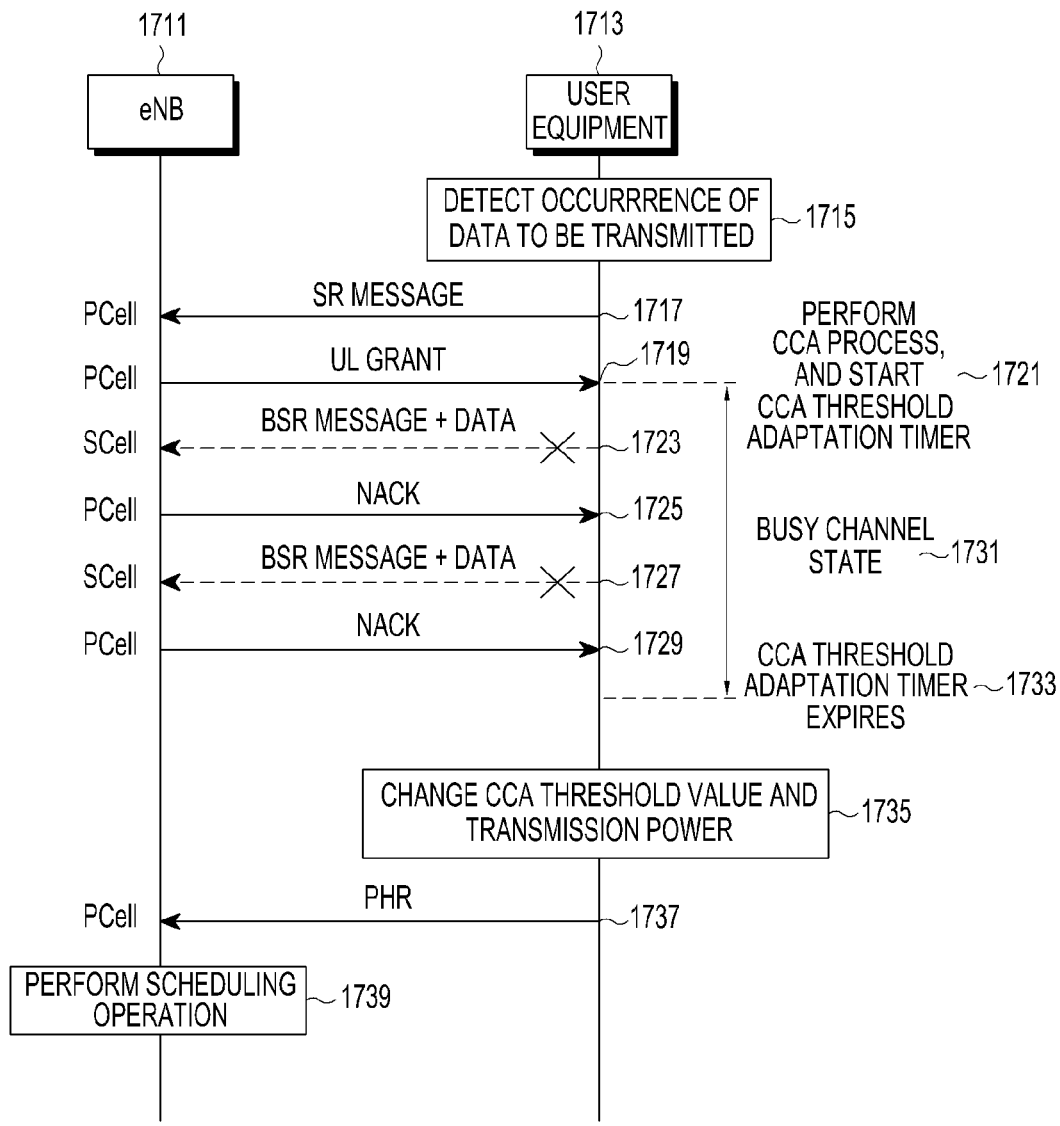
FIG. 17 schematically illustrates a process of transmitting/receiving a signal between a user equipment and an eNB in a wireless communication system supporting a unlicensed band according to an embodiment of the present disclosure.

FIG. 17 schematically illustrates a process of transmitting/receiving a signal between a user equipment and an eNB in a wireless communication system supporting a unlicensed band according to an embodiment of the present disclosure.

Referring to FIG. 17, the wireless communication system includes an eNB 1711 and a user equipment 1711.

Upon detecting that data to be transmitted occurs (at operation 1715), the user equipment 1711 transmits a scheduling request (SR) message to the eNB 1711 (at operation 1717). The SR message is transmitted through a Primary Cell (PCell) which operates in a licensed band of the wireless communication system.

After receiving the SR message from the user equipment 1711, the eNB 1711 allocates a resource to the user equipment 1711, and transmits a UL grant including information about the allocated resource to the user equipment 1711 through the PCell (at operation 1719). After receiving the UL grant from the eNB 1711, the user equipment 1711 performs a CCA process, and starts a CCA threshold adaptation timer (at operation 1721). Here, a timing at which the CCA threshold adaptation timer is started may be a timing at which the user equipment 1713 receives a UL grant from the eNB 1711, a start timing of a UL sub-frame including a UL resource which corresponds to information about a UL resource included in the UL grant, and/or the like.

If the CCA threshold adaptation timer expires (at operation 1733) in a state (at operations 1723, 1725, 1727, 1729, and 1731) that the user equipment 1711 does not perform a transmitting operation for the data according that the user equipment 1711 detects only a busy channel state while the CCA threshold adaptation timer is being driven, the user equipment 1713 changes a CCA threshold value and transmission power according that the CCA threshold adaptation timer expires (at operation 1735). The user equipment 1713 detects a busy channel state upon receiving a NACK from the eNB 1711 (at operations 1725 and 1729) after receiving a UL grant from the eNB 1711 and transmitting a buffer state report (BSR) message and data to the eNB 1711 through a secondary Cell (SCell) based on the received UL grant (at operations 1723 and 1727).

The user equipment 1713 transmits a PHR message to the eNB 1711 through the PCell (at operation 1737). After receiving the PHR message from the user equipment 1713, the eNB 1711 performs a scheduling operation corresponding to the PHR message (at operation 1739). The scheduling operation performed by the eNB 1711 has been described above, and a detailed description thereof will be omitted herein.

Although FIG. 17 illustrates a process of transmitting/receiving a signal between a user equipment and an eNB in a wireless communication system supporting a unlicensed band according to an embodiment of the present disclosure, various changes could be made to FIG. 17. For example, although shown as a series of operations, various operations in FIG. 17 could overlap, occur in parallel, occur in a different order, or occur multiple times.

A process of transmitting/receiving a signal between a user equipment and an eNB in a wireless communication system supporting a unlicensed band according to an embodiment of the present disclosure has been described with reference to FIG. 17, and an inner structure of a transmitting device in a wireless communication system supporting a unlicensed band according to an embodiment of the present disclosure will be described with reference to FIG. 18.

Figure 18:
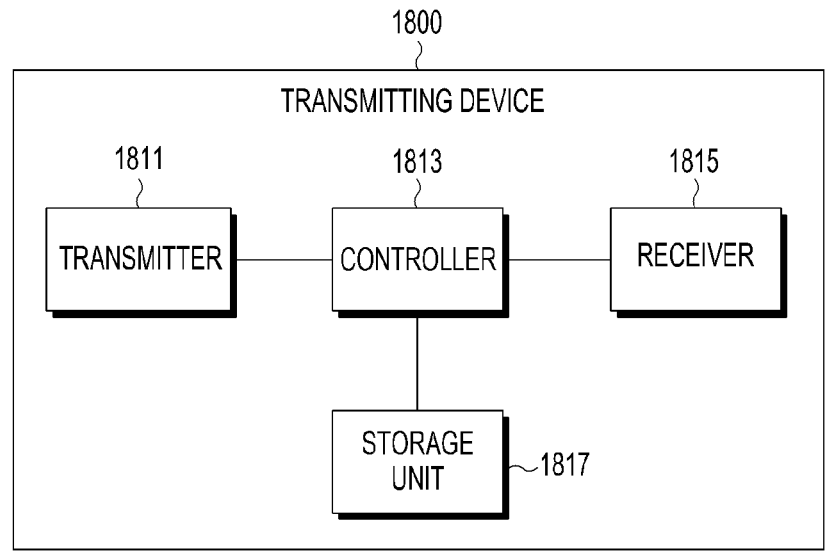
FIG. 18 schematically illustrates an inner structure of a transmitting device in a wireless communication system supporting a unlicensed band according to an embodiment of the present disclosure.

FIG. 18 schematically illustrates an inner structure of a transmitting device in a wireless communication system supporting a unlicensed band according to an embodiment of the present disclosure.

Referring to FIG. 18, a transmitting device 1800 includes a transmitter 1811, a controller 1813, a receiver 1815, and a storage unit 1817.

The controller 1813 controls the overall operation of the transmitting device 1800, and more particularly, controls an operation related to a signal transmitting/receiving operation which decreases transmission delay in a wireless communication system supporting a unlicensed band. The operation related to the signal transmitting/receiving operation which decreases the transmission delay in the wireless communication system supporting the unlicensed band has been described with reference to FIGS. 4 to 17 and a detailed description thereof will be omitted herein.

The transmitter 1811 transmits various signals and various messages to other devices, for example, a receiving device, and/or the like included in the wireless communication system supporting the unlicensed band under a control of the controller 1813. The various signals and the various messages transmitted in the transmitter 1811 have been described in FIGS. 4 to 17 and a detailed description thereof will be omitted herein.

The receiver 1815 receives various signals and various messages from the other devices, for example, the receiving device, and/or the like included in the wireless communication system supporting the unlicensed band under a control of the controller 1813. The various signals and the various messages received in the receiver 1815 have been described in FIGS. 4 to 17 and a detailed description thereof will be omitted herein.

The storage unit 1817 stores a program, various data, and/or the like related to an operation related to the operation related to the signal transmitting/receiving operation which decreases the transmission delay in the wireless communication system supporting the unlicensed band, performed in the transmitting device 1800 under a control of the controller 1813

The storage unit 1817 stores the various signals, the various messages, and/or the like received by the receiver 1815 from the other devices.

Although the transmitter 1811, the controller 1813, the receiver 1815, and the storage unit 1817 are described as separate processors in the transmitting device 1800, it is to be understood that the transmitting device 1800 may be implemented with a form into which two or more of the transmitter 1811, the controller 1813, the receiver 1815, and the storage unit 1817 may be incorporated.

The transmitting device 1800 may be implemented with one processor.

An inner structure of a transmitting device in a wireless communication system supporting a unlicensed band according to an embodiment of the present disclosure has been described with reference to FIG. 18, and an inner structure of a receiving device in a wireless communication system supporting a unlicensed band according to an embodiment of the present disclosure will be described with reference to FIG. 19.

Figure 19:
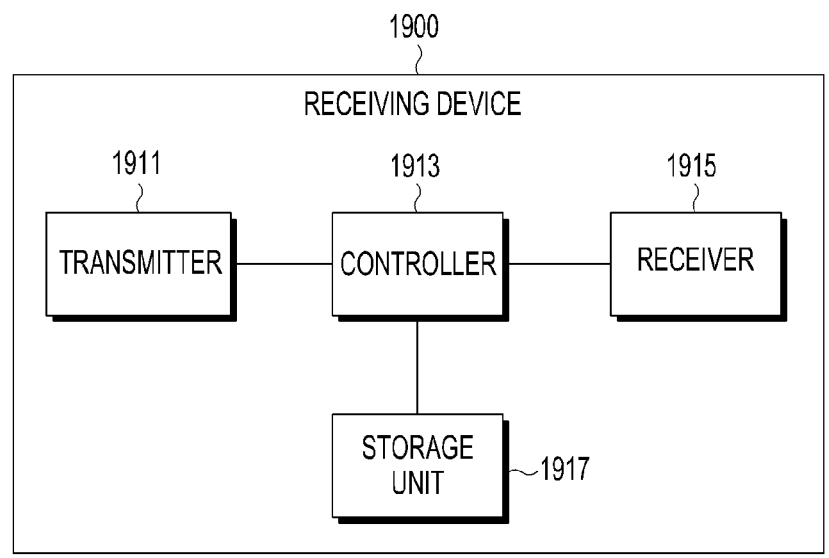
FIG. 19 schematically illustrates an inner structure of a receiving device in a wireless communication system supporting a unlicensed band according to an embodiment of the present disclosure.

FIG. 19 schematically illustrates an inner structure of a receiving device in a wireless communication system supporting a unlicensed band according to an embodiment of the present disclosure.

Referring to FIG. 19, a receiving device 1900 includes a transmitter 1911, a controller 1913, a receiver 1915, and a storage unit 1917.

The controller 1913 controls the overall operation of the receiving device 1900, and more particularly, controls an operation related to a signal transmitting/receiving operation which decreases transmission delay in a wireless communication system supporting a unlicensed band. The operation related to the signal transmitting/receiving operation which decreases the transmission delay in the wireless communication system supporting the unlicensed band has been described with reference to FIGS. 4 to 17 and a detailed description thereof will be omitted herein.

The transmitter 1911 transmits various signals and various messages to other devices, for example, a transmitting device, and/or the like included in the wireless communication system supporting the unlicensed band under a control of the controller 1913. The various signals and the various messages transmitted in the transmitter 1911 have been described in FIGS. 4 to 17 and a detailed description thereof will be omitted herein.

The receiver 1915 receives various signals and various messages from the other devices, for example, the transmitting device, and/or the like included in the wireless communication system supporting the unlicensed band under a control of the controller 1913. The various signals and the various messages received in the receiver 1915 have been described in FIGS. 4 to 17 and a detailed description thereof will be omitted herein.

The storage unit 1917 stores a program, various data, and/or the like related to an operation related to the operation related to the signal transmitting/receiving operation which decreases the transmission delay in the wireless communication system supporting the unlicensed band, performed in the receiving device 1900 under a control of the controller 1913.

The storage unit 1917 stores the various signals, the various messages, and/or the like received by the receiver 1915 from the other devices.

Although the transmitter 1911, the controller 1913, the receiver 1915, and the storage unit 1917 are described as separate processors in the receiving device 1900, it is to be understood that the receiving device 1900 may be implemented with a form into which two or more of the transmitter 1911, the controller 1913, the receiver 1915, and the storage unit 1917 may be incorporated.

The receiving device 1900 may be implemented with one processor.

An embodiment of the present disclosure enables to transmit/receive a signal in a wireless communication system supporting a unlicensed band.

An embodiment of the present disclosure enables to transmit/receive a signal thereby decreasing transmission delay in a wireless communication system supporting a unlicensed band.

An embodiment of the present disclosure enables to transmit/receive a signal thereby enabling to perform an LBT regulation process corresponding to transmission delay in a wireless communication system supporting a unlicensed band.

An embodiment of the present disclosure enables to transmit/receive a signal thereby enabling to perform an LBT regulation process by adaptively controlling a CCA threshold value corresponding to transmission delay in a wireless communication system supporting a unlicensed band.

An embodiment of the present disclosure enables to transmit/receive a signal thereby enabling to perform an LBT regulation process in which a transmitting device reports transmission power information in a wireless communication system supporting a unlicensed band.

An embodiment of the present disclosure enables to transmit/receive a signal thereby enabling to perform an LBT regulation process for increasing a probability that a clear channel is detected.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital video disc (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method of a transmitting device in a wireless communication system supporting an unlicensed band, the method comprising:
   determining to control a clear channel assessment (CCA) threshold value while performing a CCA process; and
   controlling the CCA threshold value used in the CCA process by one of:

using, at a second CCA opportunity, a second CCA threshold value which is less than a first CCA threshold value used at a first CCA opportunity in case of identifying success of a CCA process at the first CCA opportunity or identifying interference less than the first CCA threshold value at the first CCA opportunity; or using, at the second CCA opportunity, the second CCA threshold value which is greater than the first CCA threshold value used at the first CCA opportunity in case of identifying transmission delay corresponding to set time at the first CCA opportunity or identifying interference greater than the first CCA threshold value at the first CCA opportunity, wherein a CCA opportunity is an opportunity at which a CCA process is performable, the first CCA opportunity is before the second CCA opportunity, and the first and second CCA threshold values are used to identify a busy channel or a clear channel.

2. The method of claim 1, wherein determining to control the CCA threshold value while performing the CCA process comprises:
determining to control the CCA threshold value if transmission delay which corresponds to a set time occurs while performing the CCA process.

3. The method of claim 1, wherein determining to control the CCA threshold value while performing the CCA process comprises:
determining to control the CCA threshold value if a number of automatic repeat request (ARQ) acknowledgments (ACKs) for data transmitted through the unlicensed band during a set first time, or a number of ARQ non-acknowledgments (NACKs) for the data transmitted through the unlicensed band during the set first time is greater than or equal to, or less than or equal to a set first threshold value, or
determining to control the CCA threshold value if a number of hybrid automatic repeat request (HARQ) ACKs for data transmitted through the unlicensed band during a set second time, or a number of HARQ NACKs for the data transmitted through the unlicensed band during the set second time is greater than or equal to, or less than or equal to a set second threshold value.

4. The method of claim 1, wherein determining to control the CCA threshold value while performing the CCA process comprises:
determining to control the CCA threshold value if throughput for data transmitted through the unlicensed band during a set first time is greater than or equal to, or less than or equal to a set threshold throughput, or
determining to control the CCA threshold value if average latency for data transmitted through the unlicensed band during a set second time is greater than or equal to, or less than or equal to a set threshold latency.

5. The method of claim 1, wherein determining to control the CCA threshold value while performing the CCA process comprises:
determining to control the CCA threshold value if a number of CCA slots in a clear channel state among CCA processes performed in the unlicensed band during a set first time is greater than or equal to, or less than or equal to a set first threshold value, or
determining to control the CCA threshold value if a number of CCA slots in a busy channel state among CCA processes performed in the unlicensed band during a set second time is greater than or equal to, or less than or equal to a set second threshold value.

6. The method of claim 1, wherein determining to control the CCA threshold value while performing the CCA process comprises:
determining to control the CCA threshold value if time during which the transmitting device occupies the unlicensed band during a set first time is longer than or equal to, or shorter than or equal to a set first threshold time, or
determining to control the CCA threshold value if time during which the transmitting device does not occupy the unlicensed band during a set second time is longer than or equal to, or shorter than or equal to a set second threshold time.

7. The method of claim 1, wherein determining to control the CCA threshold value while performing the CCA process comprises:
determining to control the CCA threshold value if average signal strength from at least one transmitting device measured in the unlicensed band during a set first time is greater than or equal to, or less than or equal to set threshold signal strength,
determining to control the CCA threshold value if an average buffer occupancy rate of a transmitting device measured in the unlicensed band during a set second time is greater than or equal to, or less than or equal to a set threshold buffer occupancy rate, or
determining to control the CCA threshold value upon receiving a predefined signal in the unlicensed band from other transmitting devices.

8. A transmitting device in a wireless communication system, the transmitting device comprising:
a transceiver configured to transmit or receive a signal; and
at least one processor coupled with the transceiver and configured to:
determine to control a clear channel assessment (CCA) threshold value while performing a CCA process; and
control the CCA threshold value used in the CCA process by one of:
using, at a second CCA opportunity, a second CCA threshold value which is less than a first CCA threshold value used at a first CCA opportunity in case of identifying success of a CCA process at the first CCA opportunity or identifying interference less than the first CCA threshold value at the first CCA opportunity; or
using, at the second CCA opportunity, the second CCA threshold value which is greater than the first CCA threshold value used at the first CCA opportunity in case of identifying transmission delay corresponding to set time at the first CCA opportunity or identifying interference greater than the first CCA threshold value at the first CCA opportunity,
wherein a CCA opportunity is an opportunity at which a CCA process is performable, the first CCA opportunity is before the second CCA opportunity, and the first and second CCA threshold values are used to identify a busy channel or a clear channel.

9. The transmitting device of claim 8, wherein the at least one processor is configured to determine to control the CCA threshold value if transmission delay which corresponds to set time occurs while performing the CCA process.

10. The transmitting device of claim 8, wherein the at least one processor is configured to:

determine to control the CCA threshold value if a number of automatic repeat request (ARQ) acknowledgments (ACKs) for data transmitted through an unlicensed band during a set first time, or a number of ARQ non-acknowledgments (NACKs) for the data transmitted through the unlicensed band during the set first time is greater than or equal to, or less than or equal to a set first threshold value, or determine to control the CCA threshold value if a number of hybrid automatic repeat request (HARQ) ACKs for data transmitted through the unlicensed band during a set second time, or a number of HARQ NACKs for the data transmitted through the unlicensed band during the set second time is greater than or equal to, or less than or equal to a set second threshold value.

11. The transmitting device of claim 8, wherein the at least one processor is configured to:

determine to control the CCA threshold value if throughput for data transmitted through an unlicensed band during a set first time is greater than or equal to, or less than or equal to a set threshold throughput, or determine to control the CCA threshold value if average latency for data transmitted through the unlicensed band during a set second time is greater than or equal to, or less than or equal to a set threshold latency.

12. The transmitting device of claim 8, wherein the at least one processor is configured to:

determine to control the CCA threshold value if a number of CCA slots in a clear channel state among CCA processes performed in an unlicensed band during a set first time is greater than or equal to, or less than or equal to a set first threshold value, or determine to control the CCA threshold value if a number of CCA slots in a busy channel state among CCA processes performed in the unlicensed band during a set second time is greater than or equal to, or less than or equal to a set second threshold value.

13. The transmitting device of claim 8, wherein the at least one processor is configured to:

determine to control the CCA threshold value if time during which the transmitting device occupies an unlicensed band during a set first time is longer than or equal to, or shorter than or equal to a set first threshold time, or determine to control the CCA threshold value if time during which the transmitting device does not occupy the unlicensed band during a set second time is longer than or equal to, or shorter than or equal to a set second threshold time.

14. The transmitting device of claim 8, wherein the at least one processor is configured to:

determine to control the CCA threshold value if average signal strength from at least one transmitting device measured in an unlicensed band during a set first time is greater than or equal to, or less than or equal to a set threshold signal strength, determine to control the CCA threshold value if an average buffer occupancy rate of a transmitting device measured in the unlicensed band during a set second time is greater than or equal to, or less than or equal to a set threshold buffer occupancy rate, or determine to control the CCA threshold value upon receiving a predefined signal in the unlicensed band from other transmitting devices.

* * * * *